United States Patent [19]

Graham et al.

[11] Patent Number: 4,819,153
[45] Date of Patent: Apr. 4, 1989

[54] MICROPROCESSOR CONTROLLED RIGID DISK FILE SUBSYSTEM

[75] Inventors: Randolph H. Graham, Fremont; Bruce R. Peterson, San Jose; Richard J. Blackborow, Cupertino, all of Calif.

[73] Assignee: Plus Development Corporation, Milpitas, Calif.

[21] Appl. No.: 741,588

[22] Filed: Jun. 5, 1985

[51] Int. Cl.⁴ .......................... G06F 1/00; G11B 5/012
[52] U.S. Cl. .................. 362/200; 360/99.08; 360/75; 360/77.04; 360/78.05
[58] Field of Search ... 364/200 MS File, 900 MS File; 360/75, 97–99, 77

[56] References Cited

U.S. PATENT DOCUMENTS

| | | | |
|---|---|---|---|
| 3,990,055 | 11/1976 | Henderson et al. | 364/200 |
| 4,217,612 | 8/1980 | Matla et al. | 360/78 |
| 4,218,742 | 8/1980 | Carlton et al. | 364/200 |
| 4,237,502 | 12/1980 | Erickson, Jr. et al. | 360/78 |
| 4,314,291 | 2/1982 | Oda et al. | 360/78 |
| 4,333,117 | 6/1982 | Johnaon | 360/78 |
| 4,396,959 | 8/1983 | Harrison et al. | 360/77 |
| 4,418,368 | 11/1983 | Nalley et al. | 360/78 |
| 4,419,701 | 12/1983 | Harrison et al. | 360/77 |
| 4,424,543 | 1/1984 | Lewis et al. | 360/135 |
| 4,485,418 | 11/1984 | Bremmer | 360/77 |
| 4,516,177 | 5/1985 | Moon et al. | 360/77 |
| 4,547,822 | 10/1985 | Brown | 360/78 |
| 4,554,598 | 11/1985 | Tarbox et al. | 360/48 |
| 4,568,988 | 2/1986 | McGinlay et al. | 360/77 |
| 4,600,868 | 7/1986 | Bryant | 360/78 |
| 4,639,798 | 1/1987 | Harrison et al. | 360/73 |

OTHER PUBLICATIONS

Cruce & Alexander, "Building a Hard-Disk Interface For an S-100 Bus System", Byte Magazine, Apr. 1983 issue, pp. 304, 306, 308–310, 314–316, 319–321.

"Seagate ST506 Disc Drive, Service Manual", Seagate Technology 920 Disc Drive, Scotts Valley, California 95066-4544, Jul. 12, 1983.

News Report, "Embedded Controller Could Change Rules", Electronics Magazine, Jun. 28, 1984 issue, pp. 50, 52.

News Article, "XEBEC Owl Combines On-board Controller, Electronics", Mini-Micro Systems Magazine, Aug. 1984 Issue, pp. 58, 61.

Two Page Advertisement for XEBEC Owl, Electronics Week Magazine, Dec. 3, 1984 Issue, pp. 14, 15.

OMTI Series 5000 Data Controller Chips, Data Sheet, 6/84.

IBM Technical Disclosure Bulletin, vol. 22, No. 6, Nov. 1979, pp. 2476-2481, Pennington et al., "Digital Sector Servo System".

Primary Examiner—Gary V. Harkcom
Assistant Examiner—Christopher H. Lynt
Attorney, Agent, or Firm—David B. Harrison

[57] ABSTRACT

An improved control system for a disk file includes head position control circuitry including at least one servo loop for controlling an electromechanical head positioner relative to a rotating data storage disk, a data controller for controlling reading and writing of data blocks from and to a storage surface of the disk, an interface circuit for connecting the disk file directly to data, address and control buses of a host computer, and a single microprocessor programmed to supervise operations of the head position control circuitry, data controller and interface circuit.

38 Claims, 21 Drawing Sheets

MICROPROCESSOR CONTROLLED RIGID DISK FILE SUBSYSTEM

BACKGROUND OF THE INVENTION

The present invention relates to rigid, non-removable disk media based data storage subsystems for use with digital computing equipment. More particularly, the present invention relates to a rigid, non-removable disk media based data storage subsystem in which a single microprocessor supervises and controls track seeking and following operations as well as data controller and host computer bus interface functions.

REFERENCE TO RELATED PATENTS AND APPLICATIONS

The following U.S. Patents and co-pending patent applications are pertinent to the present disclosure:

U.S. Pat. No. 4,396,959 for Data Transducer Position Control System for Rotating Disk Data Storage Equipment;

U.S. Pat. No. 4,419,701 for Data Transducer Actuator Control System for Rotating Disk Data Storage Equipment;

U.S. Pat. No. 4,516,177 for Rotating Rigid Disk Data Storage Device;

U.S. Pat. No. 4,639,798 for Disk Drive Having Two Interactive Electromechanical Control Subsystems;

U.S. Pat. No. 4,647,997 for Aerodynamic Latch for Disk File Actuator;

U.S. Pat. No. 4,703,176 for Optical Encoder Assembly;

U.S. Pat. No. 4,712,146 for Compact Head and Disk Assembly.

Small non-removable, rigid disk data storage subsystems have typically involved at least three separate elements: a head and disk assembly including control electronics; a controller for controlling the transfer of data to and from the host computer buses and the storage surface; and an interface enabling the subsystem to operate effectively at a bus level data transfer environment of a host computing system. Recently, the controller and interface have been merged into a single package, typically a plug-in circuit card for plugging into the backplane or "mother board" of the host computing system. The plug-in controller/interface card has then been connected by cables to the head and disk assembly control electronics.

There are drawbacks to the use of separate control electronics for the head and disk assembly and for the controller/interface. For example, the head and disk assembly control system has not been tightly coupled to the data controller. The use of separate microprocessors has not effectively utilized the processing power available, and has led to duplication of circuitry and process inefficiencies. In voice coil actuated head and disk assemblies, instantaneous perturbations, such as bumps which knock the head off of track have not been signalled immediately to the data controller, thereby leading to the writing of data off of track centerline and corrupting data stored in adjacent tracks.

A heretofore unsolved need has arisen for a small, modular control for a disk file subsystem in which the head and disk assembly is tightly coupled to the controller/interface so that the number of circuit elements is reduced, and so that process and control path efficiency is greatly enhanced, and so that the space and electrical requirements for the overall subsystem may be made very small and compact.

SUMMARY OF THE INVENTION WITH OBJECTS

A general object of the present invention is to provide a rigid, non-removable disk media based data storage subsystem in which a single microprocessor supervises and controls track seeking and following operations as well as data controller and interface functions so as to overcome the limitations and drawbacks of the prior art.

An object of the present invention is to couple a head and disk assembly tightly to a disk file controller/interface via the use of a single supervisory microprocessor.

Another object of the present invention is to employ a single supervisory microprocessor for a disk file subsystem in a manner which enables known tasks to be carried out far more efficiently than heretofore.

One more object of the present invention is to provide an overall control subsystem for a disk file which is substantially entirely formed and carried on a single very small printed circuit card module.

Yet one more object of the present invention is to provide a more positive bump detection mechanism to ensure the integrity of data during data transfer and storage operations of a disk data file subsystem.

Still another object of the present invention is to provide an improved time interval based position dependent track seeking servo system.

One more object of the present invention is to provide improved and more efficient control signal paths for the single supervisory microprocessor in a disk file subsystem.

In accordance with the present invention, an improved control system for a disk file including a head and disk assembly and a controller/interface includes a control subsystem, a controller/interface and a single programmed microcomputer.

The control subsystem controls the position of a head of the assembly relative to a rotating data storage disk of the assembly to cause the head to move to a commanded track of a multiplicity of available concentric data tracks formed on a storage surface of said disk during track seeking operations and to cause the head to remain in substantial centerline alignment with the commanded track during track following operations.

The controller/interface connects the disk file to a host for receiving commands and data to be stored from the host, controls the storing and retrieving of data from the disk surface via the head, reports disk file status and conditions to the host, and controls the sending of retrieved data to the host via the interface.

The programmed control microprocessor operatively controls operations of the control subsystem (which may be a voice coil actuator controlled by a servo or a stepping motor with or without microstep track centering adjustment based on a wedge servo) and operations of the controller/interface so as to coordinate operations of the controller/interface with the control subsystem.

In one aspect the improved control system comprises at least one servo loop which is closed through the microprocessor.

In another aspect the improved control system comprises a plurality of servo loops: a main servo loop including a polyphase position sensor mechanically linked to the head for providing coarse servo control data and track boundary determination data, and a fine servo loop including centerline offset information read by a head from the disk data surface when the microprocessor is in its main program loop and receives data from the main servo loop and data from the fine servo loop in order to maintain the head in substantial centerline alignment with the commanded track during track following operations of the head and disk assembly.

In one more aspect control data for the microprocessor is passed from the host through control registers of the data sequencer thereby eliminating a need for a separate control bus between the microprocessor and the host system.

In a further aspect the improved control system includes an aerodynamically released shipping latch for latching the head in a safe region relative to the disk and further includes an electronic return spring including a sensor for sensing loss or removal of power from the disk file and a switch circuit for thereupon connecting voltage induced in a winding of a spindle motor rotating by virtue of kinetic energy stored in the disk ordinarily rotated by the motor, to an electromechanical head mover, so as to move the head to the safe region of the disk surface before the disk ceases to rotate sufficiently to maintain headflight.

In one more aspect of the present invention, the improved control system includes a bump detector for automatically inhibiting any writing to the disk surface in the event of detection of a physical perturbation which tends to move the head out of centerline alignment of a data track.

In still one more aspect of the present invention, an improved servo control system is provided for controlling track seeking operations in a data storage file. The file includes a nonremovable data storage disk rotating at a predetermined angular velocity and an electromagnetic voice coil actuator for moving a data transducer head among selected ones of a multiplicity of concentric data tracks formed on a data storage surface of the disk. The electromagnetic voice coil actuator is under the control of a programmed digital processor during the seeking operation, wherein the processor commands the actuator to move the head from a known departure track location to a known destination track location by commanding a current to pass through the coil of the actuator. The improved track seeking system includes:

a relative track determination mechanism for determining and signalling digitally a particular track of a group of adjacent tracks over which the transducer head is instantly located during a track seeking operation, a timer for repeatedly signalling elapse of a fixed time interval throughout the track seeking operation, the time interval being selected to be less than the time required for the transducer head to traverse a group of adjacent tracks during the highest transducer head seek velocity portion of the track seeking operation, a look-up table containing prestored position information of the desired position at which the transducer head should be located for each signalled time elapse during the track seeking operation, and wherein the programmed digital processor being responsive to each time elapse sent by the timer for thereupon receiving the relative track determination signalled by the relative track determination mechanism, for reading the look-up table to derive desired head transducer position, for comparing actual transducer head position at each signalled time elapse with the prestored position information, for calculating a position correction value in the event of a discrepancy, and for applying the position correction value to the electromagnetic voice coil actuator to urge actual head transducer position into correspondence with desired head transducer position during each elapsed time interval of the seek operation.

In yet a further aspect the relative track determination mechanism of the improved servo control system includes an optical encoder and a comparator for generating digital phase quadrature signals.

These and other objects, advantages and features of the present invention will be more fully understood and appreciated by considering the following detailed description of a preferred embodiment presented in conjunction with the accompanying drawings.

DETAILED DESCRIPTION OF A PREFERRED EMBODIMENT

Overview of Subsystem 31

Figure 1:
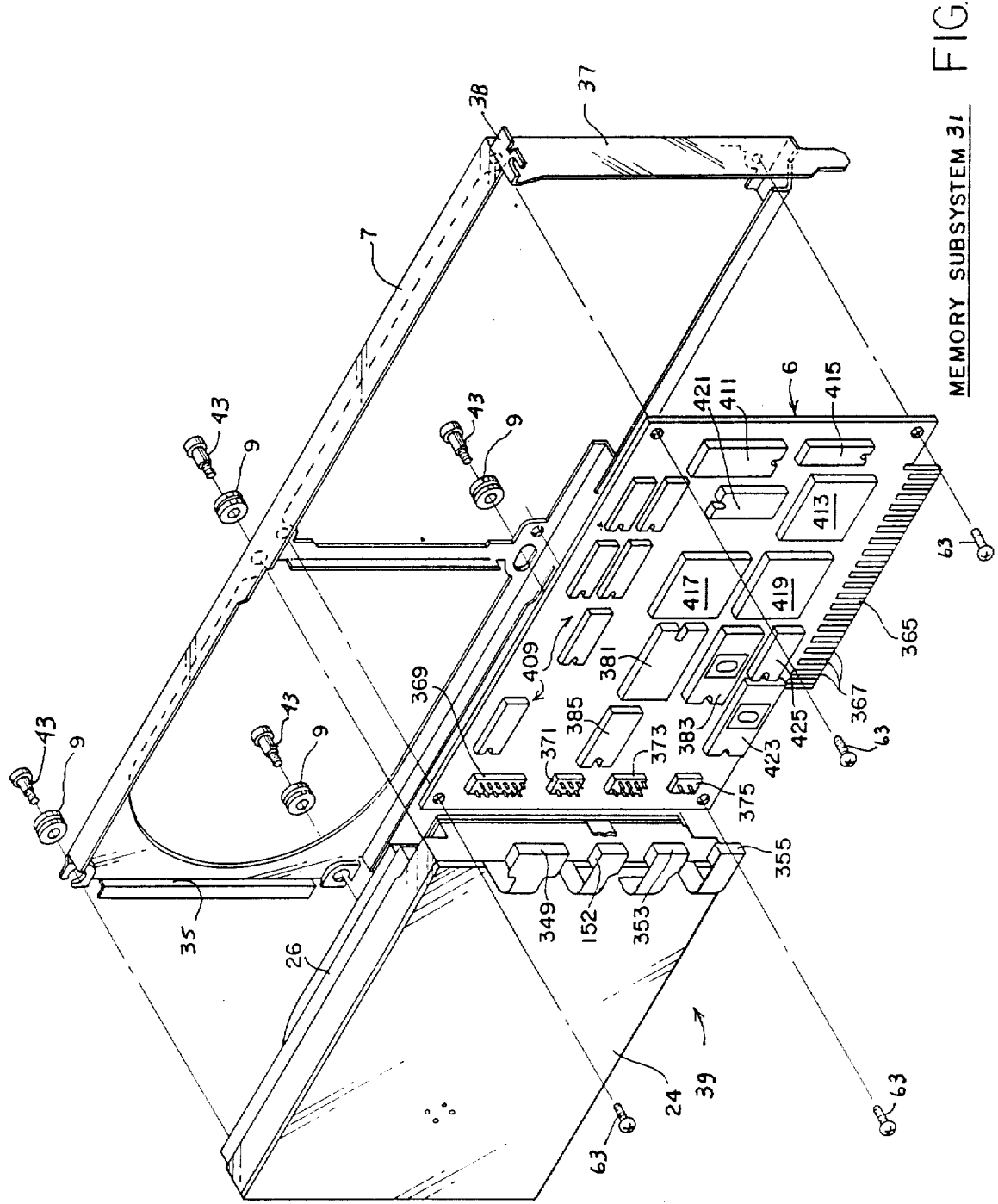
FIG. 1 is an exploded isometric and somewhat diagrammatic view of a compact, modular disk file subsystem including a control system in accordance with the principles of the present invention.

A unitized, modular miniature disk file subsystem 31, incorporating the control system of the present invention, is illustrated in exploded overview in FIG. 1. The subsystem 31 includes a frame 7 which occupies a single expansion or accessory slot of a popular personal computer, such as the IBM Personal Computer $^{tm}$. The frame includes a vertical alignment and support lip 35 at its distant end, and it includes a support plate 8 at its near end, as viewed in FIG. 1. The support plate 8 also includes a flange 38 enabling the entire subsystem 31 to be securely fastened to the personal computer in conventional fashion.

A modular, miniature head and disk assembly 39 is attached to the frame via shock absorbing grommets 9. Anchor bolts 43 secure the assembly 39 and frame 7 together through the grommets 9. The head and disk assembly includes plastic insulative covers 24, 26 on both major surfaces of the assembly. These covers prevent other accessories and peripheral circuit boards as may be plugged into the personal computer adjacent to the subsystem 31 from having their components shorted out by coming into contact with the underlying metal surfaces of the head and disk assembly 39. The compact head and disk assembly 39 is described in detail in the referenced U.S. Pat. No. 4,712,146 entitled: "Compact Head and Disk Assembly", the disclosure of which is hereby incorporated by reference into this specification at this location.

Four flexible circuit substrates extend from the head and disk assembly 39. These substrates may be conductive traces formed upon thin, flexible mylar film, or they may be thin and flat wire cables. In any event, one leads to a jack 349 for connecting internal head read/write electronics with an external read/write channel, another lead to a jack 152 for connecting in internal optical encoder subassembly with an external analog/digital servo element, another leads to a jack 353 for connecting a spindle motor control module with power supply and associated circuitry, and a final one leads to a jack 355 from a coil of a rotary head positioning actuator within the head and disk assembly 39 to connect to the external drive electronics, being part of the analog/digital servo element.

A small double sided printed circuit card 6 carries all of the electronics required for the control system of the present invention (except for the circuits within the head and disk assembly which have already been mentioned). Four screws 63 anchor the four corners of the circuit card 6 to the frame as suggested by the explosion lines in FIG. 1.

The circuit card 6 includes a conventional edge connector region 365 having properly aligned connection traces 367 for engaging corresponding contact pins of an accessory or peripheral circuit card connector of the personal computer (host system) in which the storage subsystem 31 is installed and connected solely via the traces 367 formed on the edge connector region 365.

Four plugs 369, 371, 373 and 375 are provided on the circuit card for receiving respectively the jacks 349, 152, 353 and 355, previously described. These plugs enable the circuitry inside the head and disk assembly to be connected to the circuitry carried on the circuit card 6 and to be supplied with power from the host system via the edge connector 365.

Electronics Overview

The following major circuit elements are contained on the printed circuit card 6 generally in the positions indicated in FIG. 1. (These circuit elements are interconnected in accordance with the architectural overview of FIG. 2 and in accordance with the detailed connection diagram made up of FIGS. 3a through 3i as arranged in accordance with FIG. 3 to form a single schematic.)

Microcomputer 381 and Program Memory 383

A single programmed, sequential state monolithic microcomputer 381, sometimes referred to as a "microprocessor", provides overall control of the subsystem 31. The microcomputer 381 is preferably a type 7810, manufactured by NEC Corporation, of Japan, or equivalent. The microcomputer 381 includes a single central processing unit (CPU) and a single arithmetic logic unit (ALU), as well as other internal supporting architecture. It executes only one instruction at a time.

The type 7810 is a single chip, five volt, eight bit microcomputer including an internal analog to digital converter having eight multiplex-selectable analog inputs. The analog to digital converter operates continuously by converting whatever voltage appears at a selected input into a digital value which may be read at any time by the microcomputer 381 under program control.

The microcomputer 381 also includes a 256 by eight bit RAM, multifunctional timer/event counters, general purpose serial and parallel interfaces and input/output ports, and maskable and non-maskable interrupt capability. The microcomputer 381 may also control external memory directly, and requires an external program memory for containing the instructions which it is to execute in carrying out the supervisory functions of the control system of the present invention. Each instruction cycle requires one microsecond, and the basic clocking frequency for the microcomputer 381 is 12 MHz. The software controlled functions of the microcomputer 381 are discussed in greater detail subsequently herein.

The microcomputer 381 utilizes a multiplexed bus structure, so that the same electrical lines may carry both address information and data information, at different times. These times alternate, so that in one machine cycle, a bus may be carrying addressing information, and at the next cycle, the same bus may be carrying data information, and so forth.

The 256 byte random access memory within the microcomputer 381 is used as a stack and provided all of the general purpose registers required for operations of the microcomputer.

An eight kilobyte external read only program memory 383 is connected to the microcomputer 381, and it contains the instructions which the microcomputer 381 will execute during operations of the disk file subsystem 31. These instructions are presented as a listing at the end of this specification.

The microcomputer 381 is the heart of the control system and has two overall tasks: it supervises and controls radial head position via an electromagnetic voice coil actuator 300 of the head and disk assembly 39 via servo control loops, and it responds to commands from the host computer system by initiating and monitoring transfers of blocks of data to and from the host and the disk data storage surfaces via the controller/interface.

It is important to remember that throughout the data read/write operations and data transfer operations the microcomputer 381 is monitored the progress of such operations and it is simultaneously controlling the track following head position servo loop so that it is tightly servoing the head 320 at the centerline of the track at which data is being read or being written.

Track Positioning and Following Servos

The subsystem servo performs two functions: First, it must hold read/write data transducer heads in alignment with the centerline of each data track during track following operations. Second, it must be able to perform track seeking operations which cause the head 320 to be moved rapidly and accurately from a known departure track location to a desired destination track location. All servo operations are controlled and supervised by the microcomputer 381 which controls the current which passes through the coil 308 of the voice coil actuator 300.

An analog/digital servo circuit 385 is connected to the microcomputer 381, and the circuit provides circuit elements which are required to carry out servo control loop functions in data track seeking and track following operations of the head and disk assembly. This monolithic circuit 385 is explained in greater detail in conjunction with FIG. 10 hereinafter.

An optical encoder assembly 86 is provided inside the head and disk assembly 39. This encoder 86 includes a moving scale 112 having a multiplicity of spaced apart radial microlines. An infrared light emitting diode 118 causes light to pass downwardly through the microlined scale and through an underlying stationary masked photodetector array 124. The array 124 responds to relative light levels indicative of position of the scale 112 and with the aid of the overlying mask converts the light levels into two phase shifted signals P1 and P2 which are in phase quadrature.

These phase signals are converted to voltages by current to voltage converters 525, 527 of the encoder assembly 86 and are then supplied as analog values to the analog to digital converter within the microcomputer 381, and also to the analog/digital servo chip 385 which converts the analog P1 and P2 values into digital values and returns them digitized to the microcomputer 381.

Figure 5:
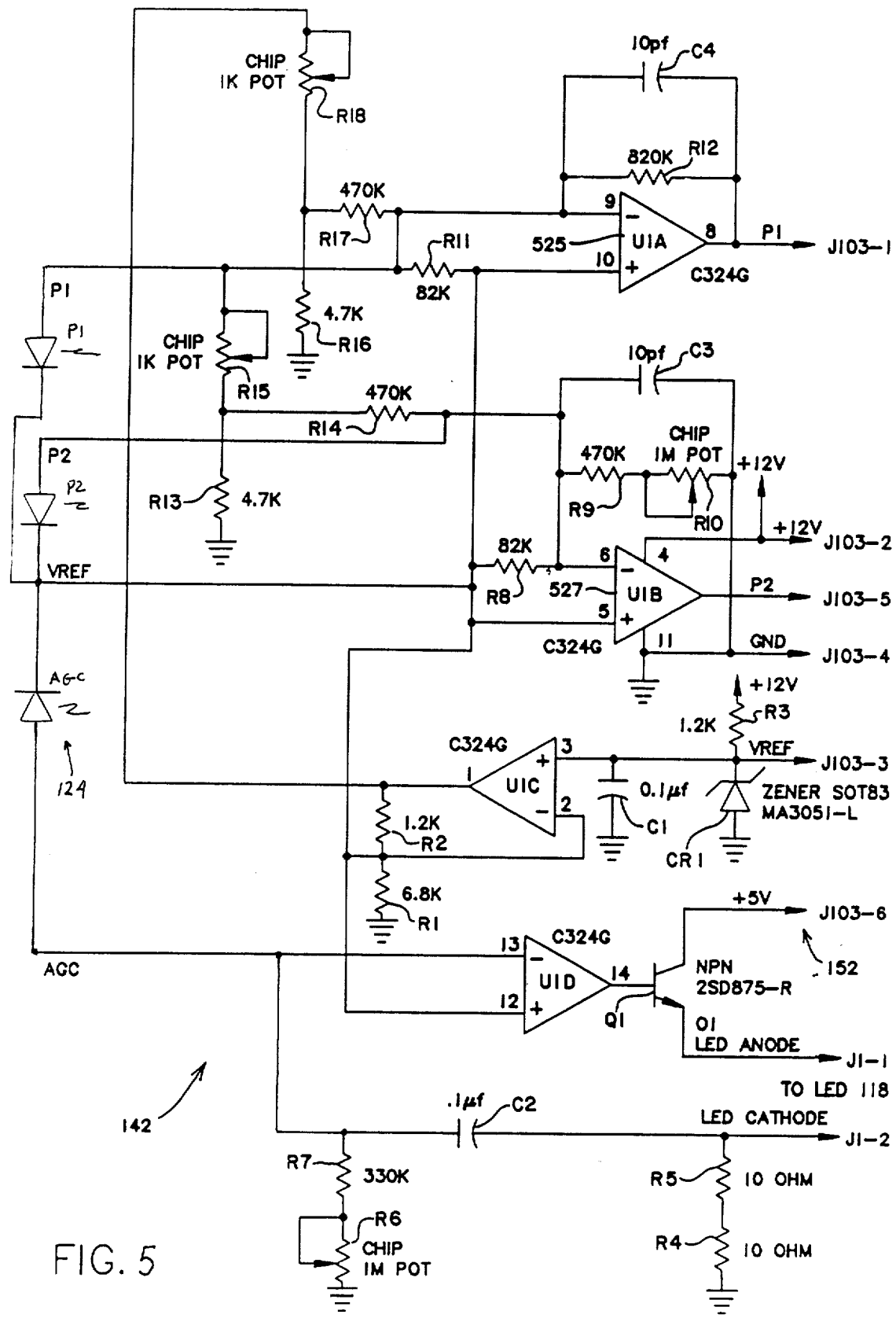
FIG. 5 is an electrical circuit schematic and block diagram of an optical encoder subassembly mounted within the head and disk assembly shown in FIG. 1, and which is plugconnectible with the analog servo electronics depicted in FIG. 3.

The circuitry of the encoder is set forth and discussed herein in greater detail in conjunction with FIG. 5. An optical encoder assembly suitable for use with the disk file subsystem 31 of the present invention is described in the referenced U.S. Pat. No. 4,703,176 entitled: "Optical Encoder Assembly", the disclosure of which is hereby incorporated by reference into this this specification at this location.

Figure 2:
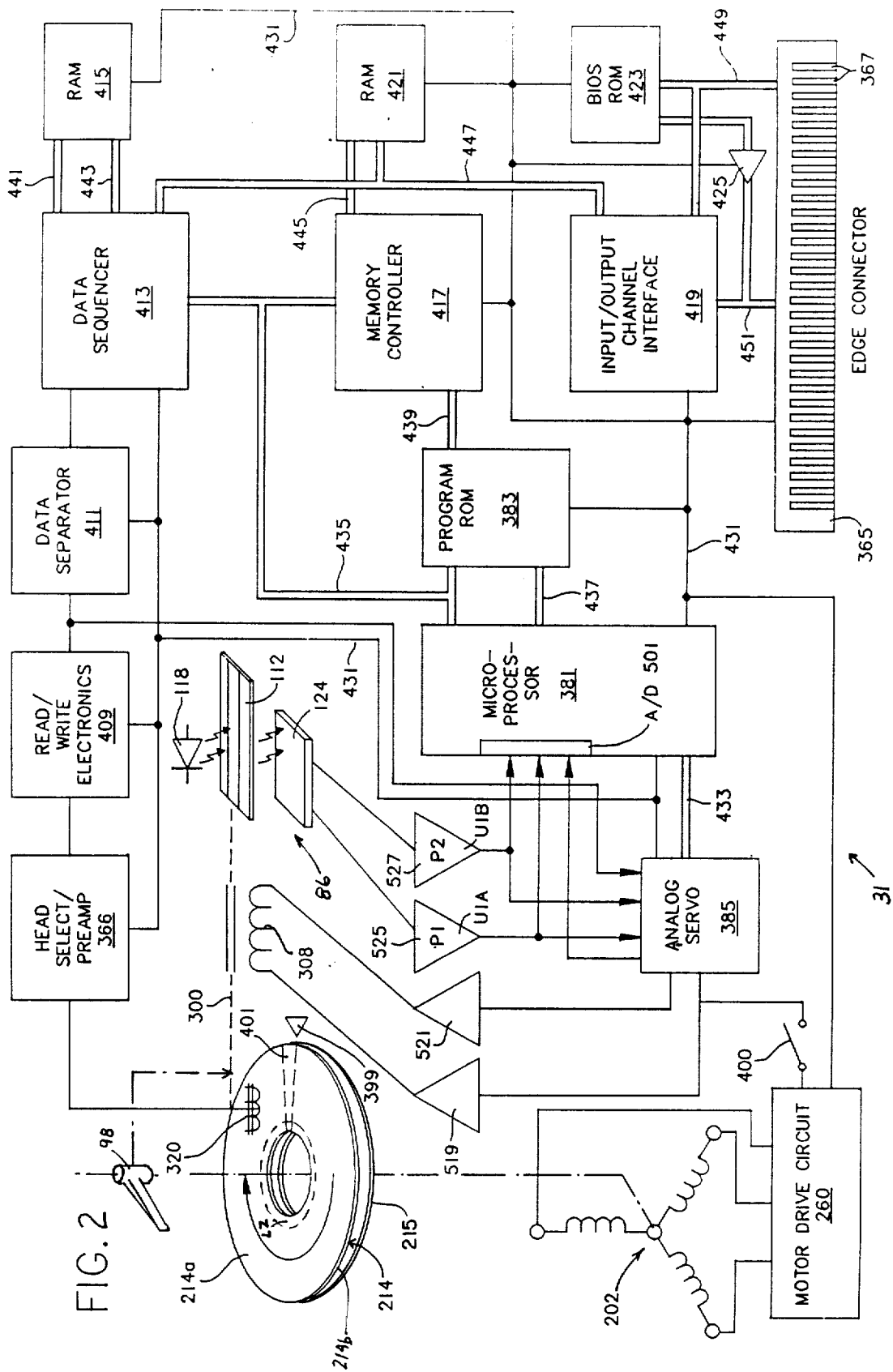
FIG. 2 is an electrical block diagram of the disk file subsystem and control system illustrated in FIG. 1.
Figure 3:
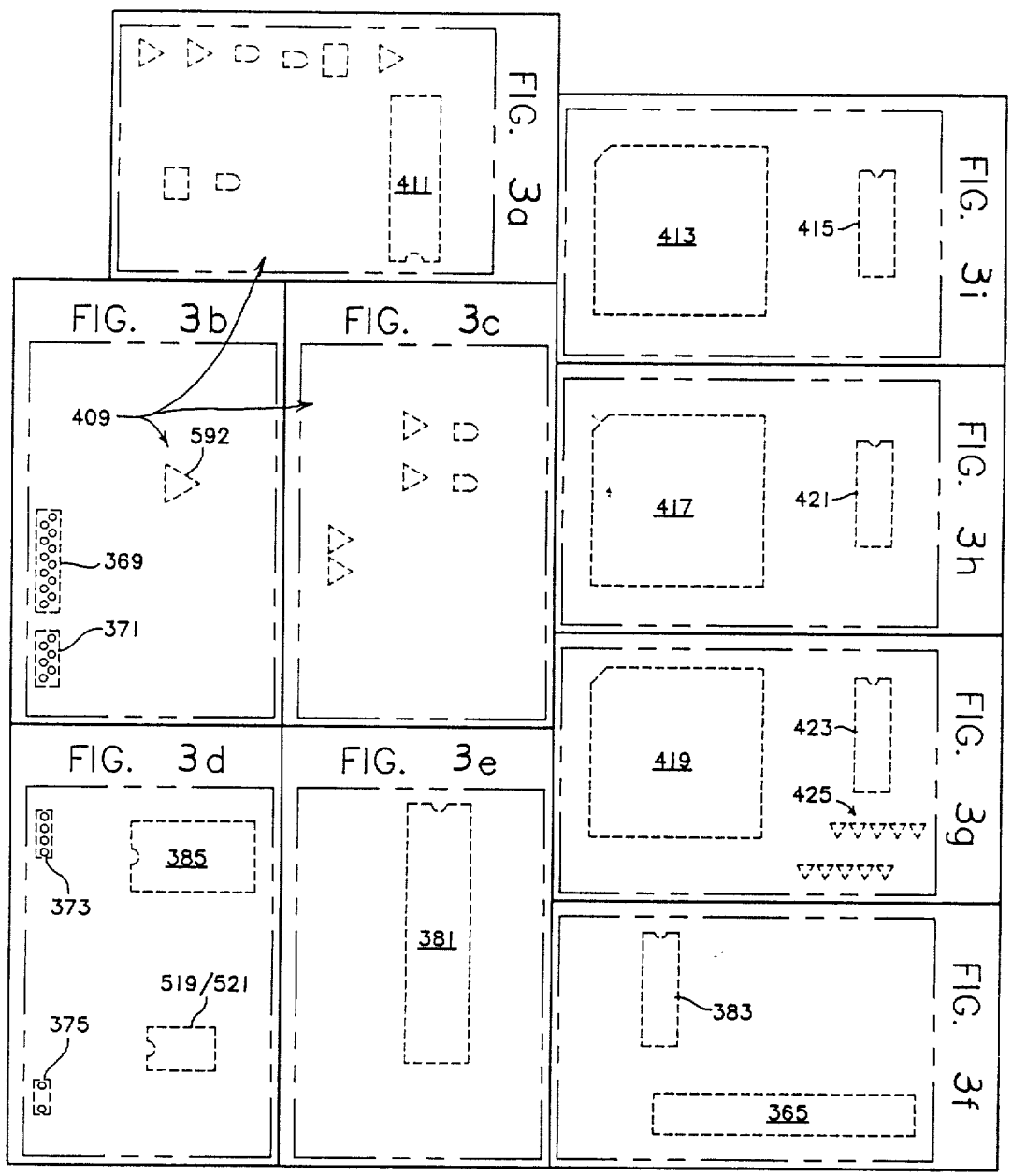
FIG. 3 is a layout plan for the nine sheets of FIGS. 3a through 3i and explains how these sheets should be arranged together in order to provide the overall single electrical schematic.
Figure 3A:
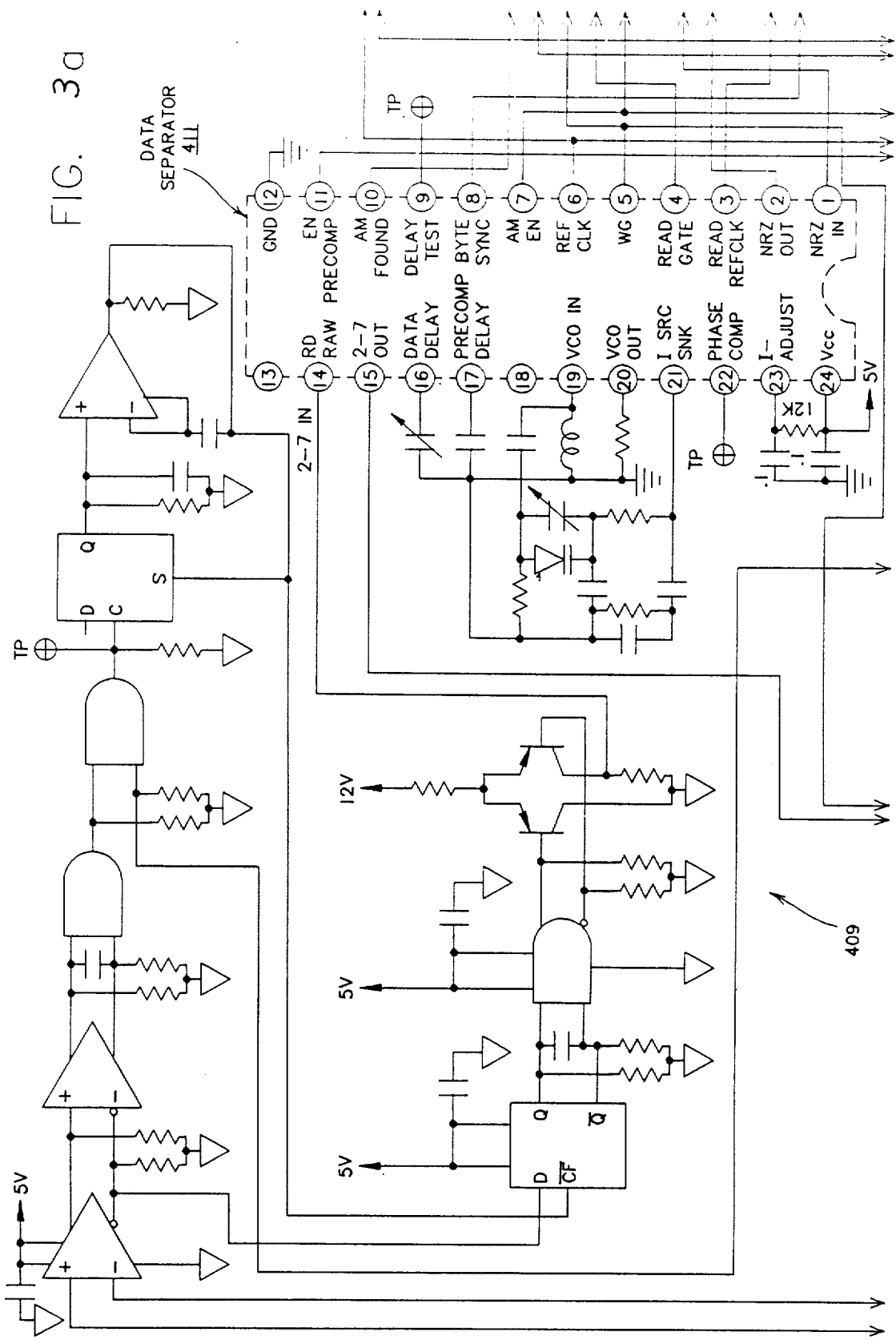
FIGS. 3a through 3i are nine sheets of drawing which together set forth a single electrical circuit schematic of a control circuit for a disk file subsystem of the type illustrated in FIGS. 1 and 2.
Figure 3B:
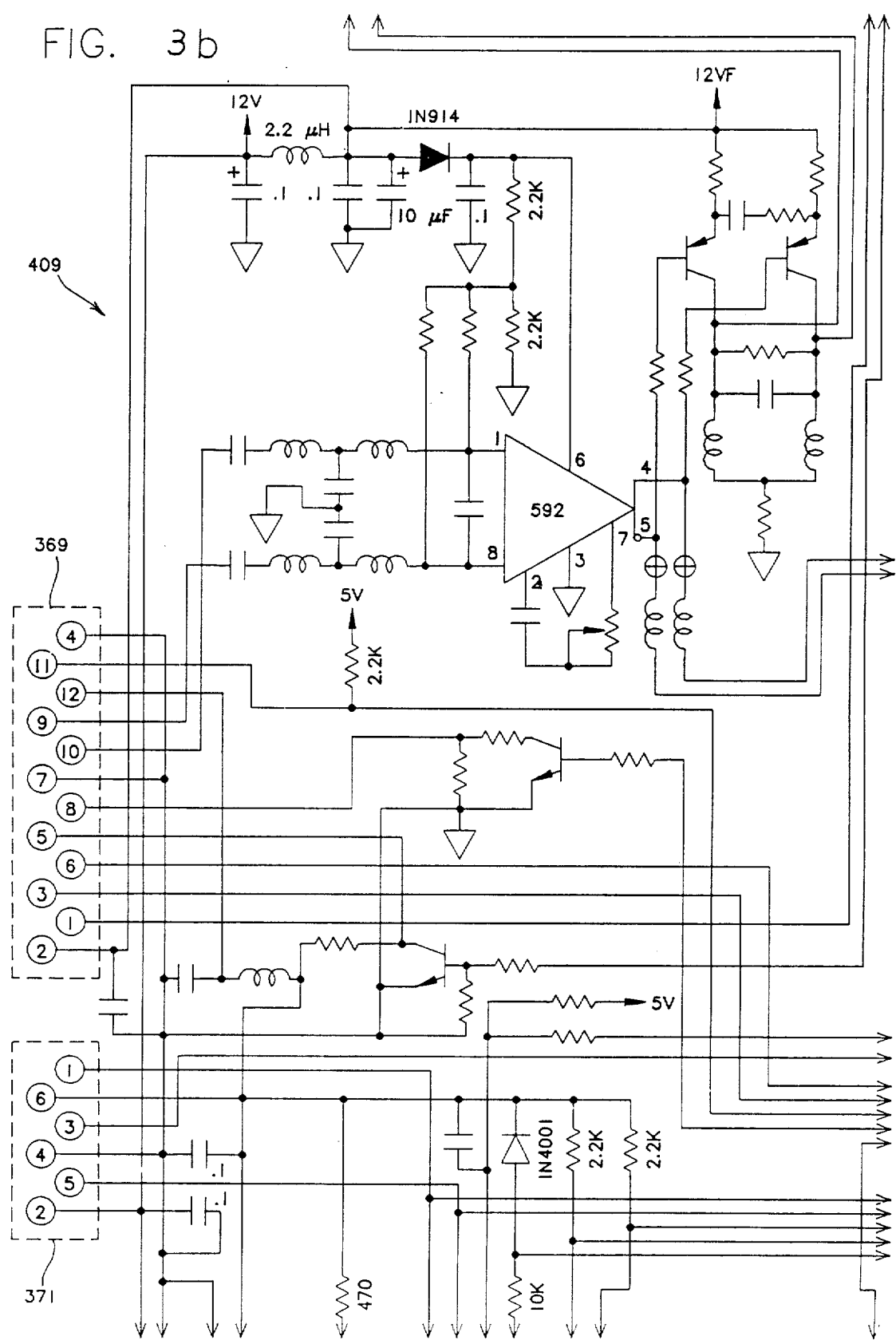
Figure 3C:
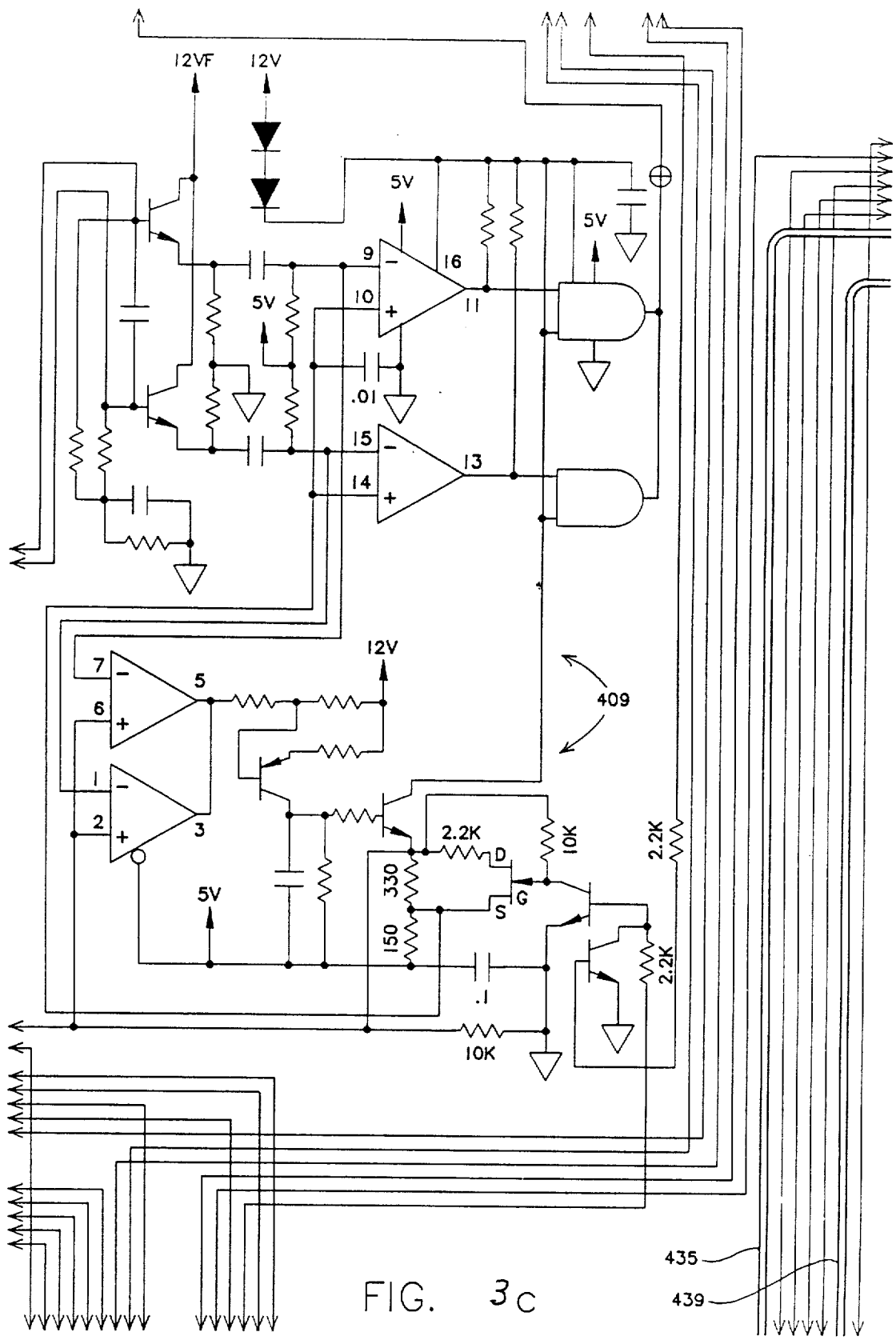
Figure 3D:
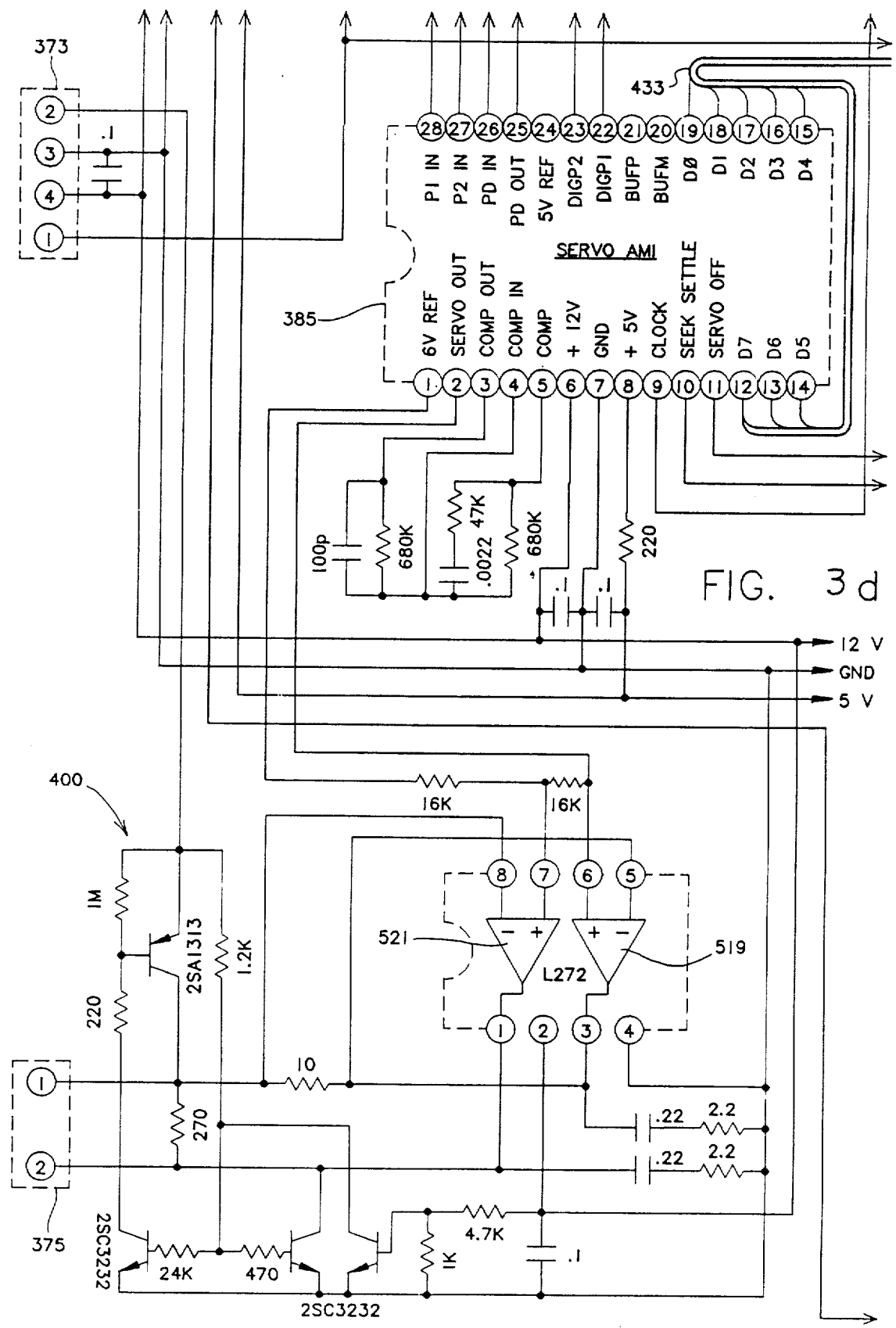
Figure 3E:
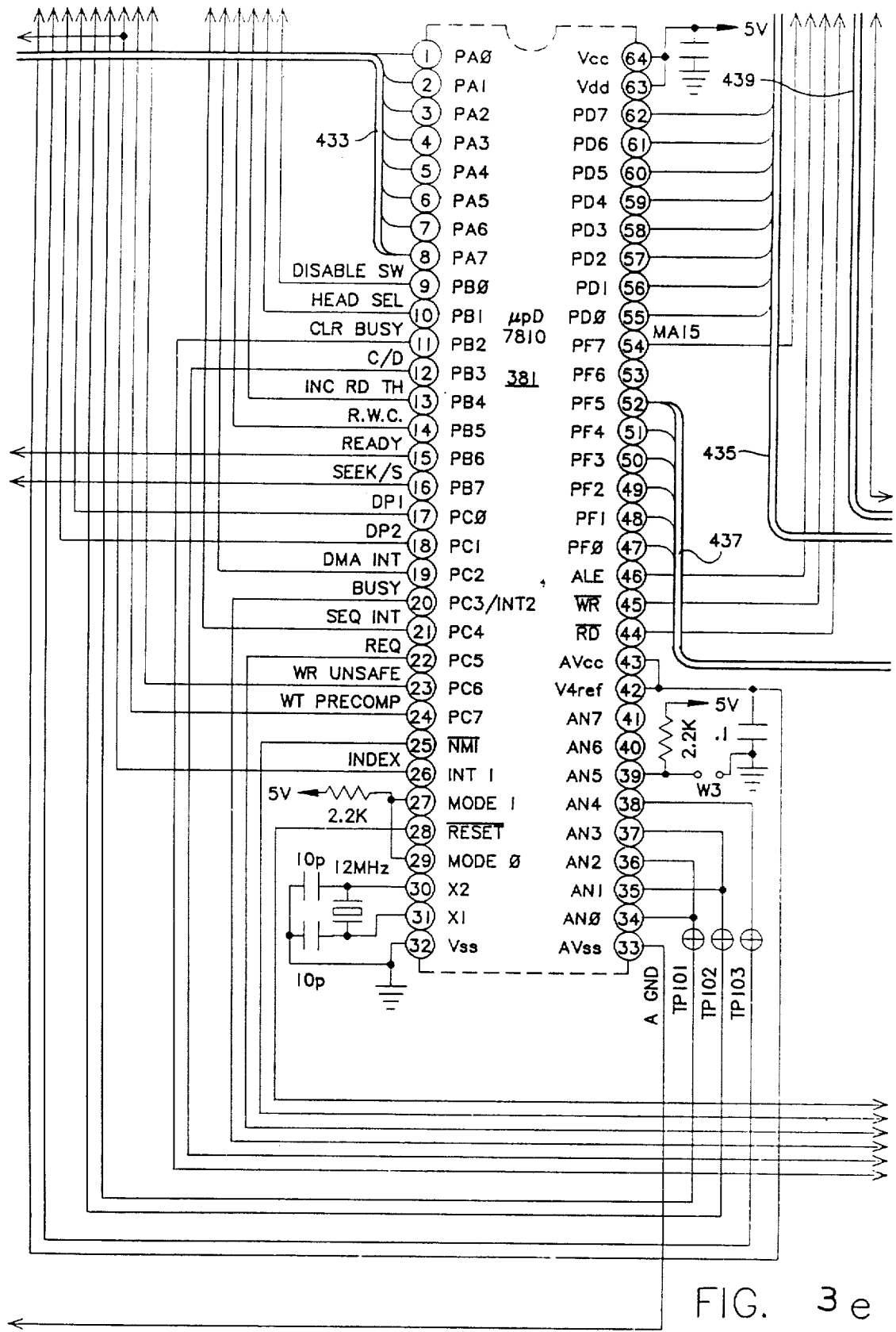
Figure 3F:
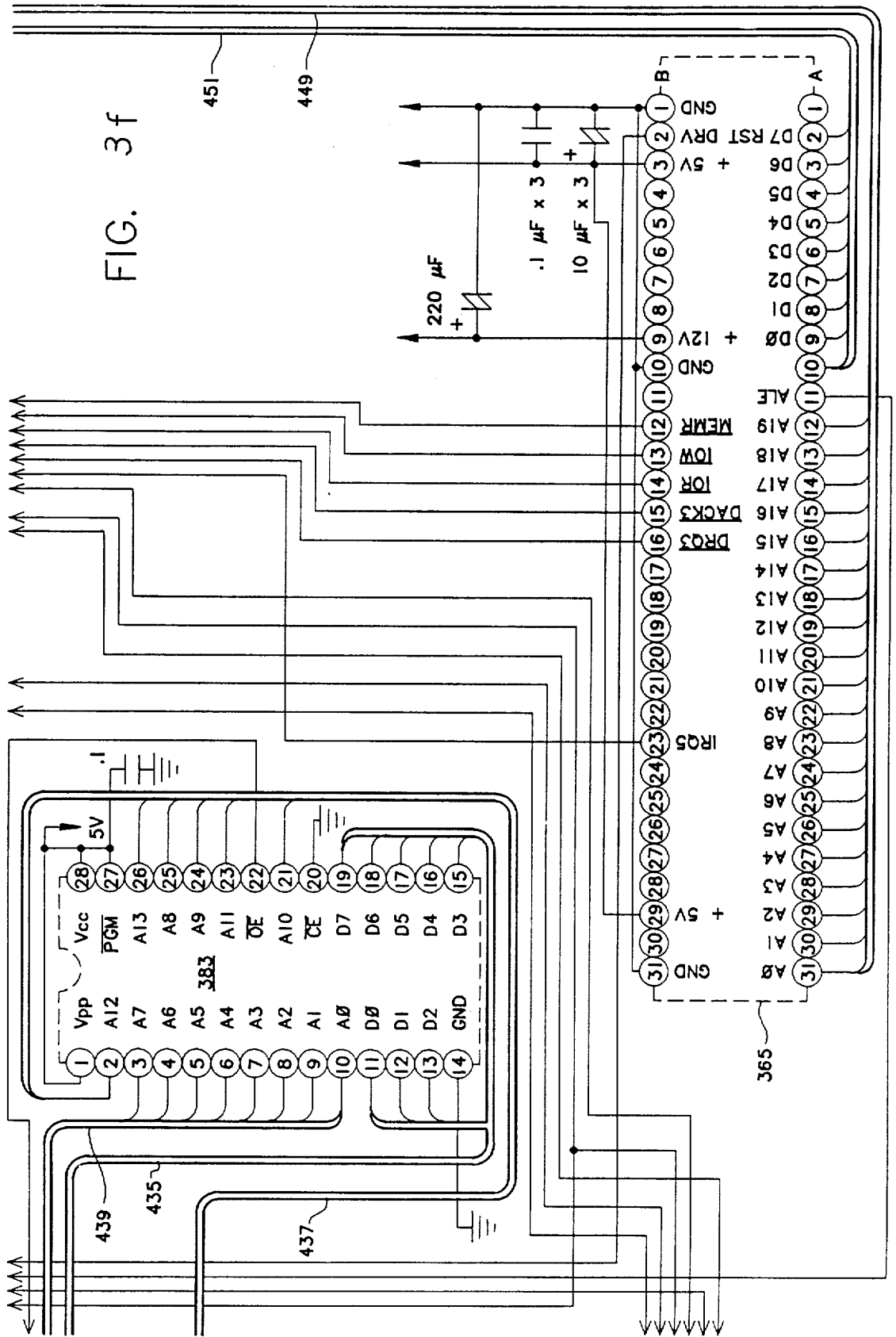
Figure 3G:
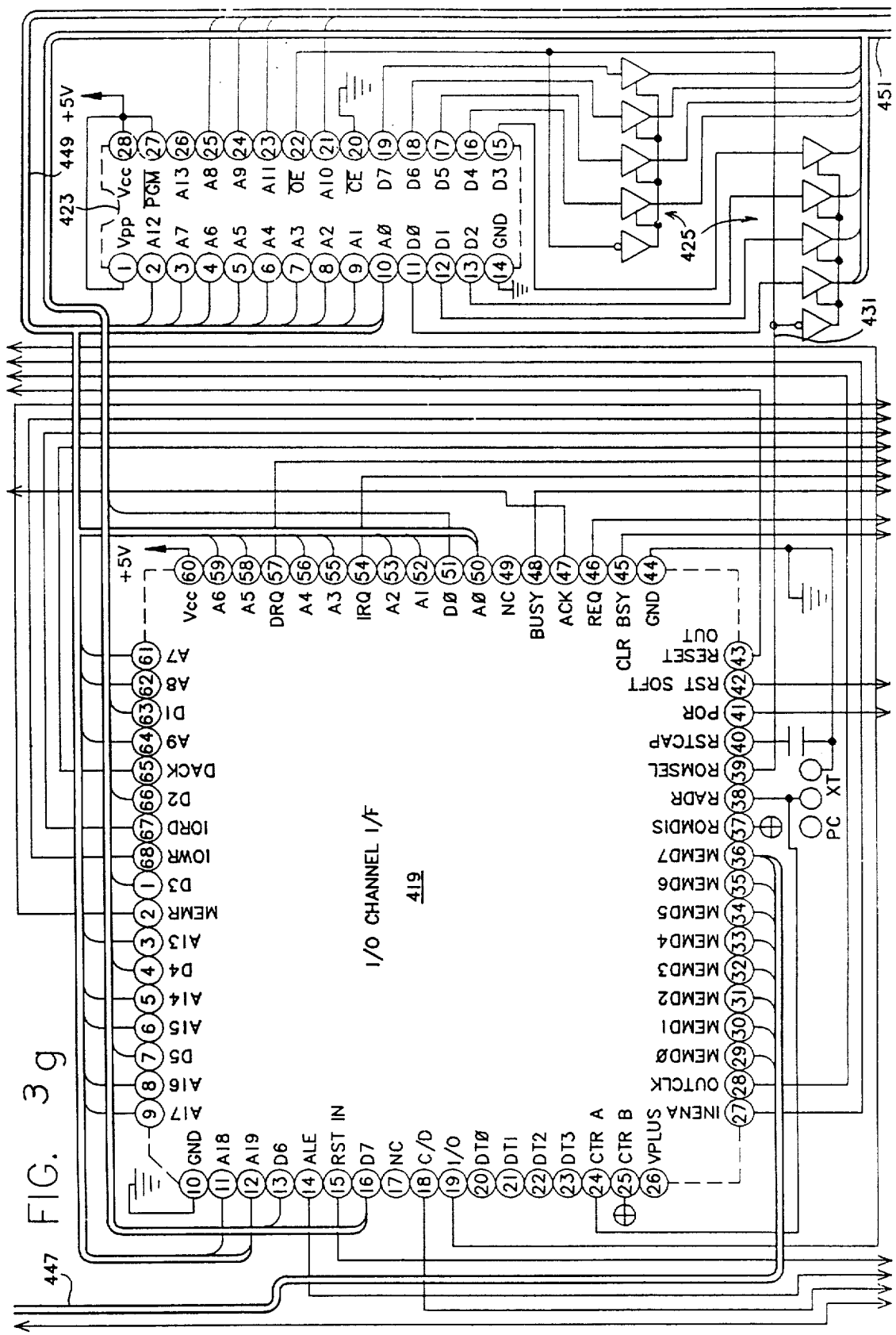
Figure 3H:
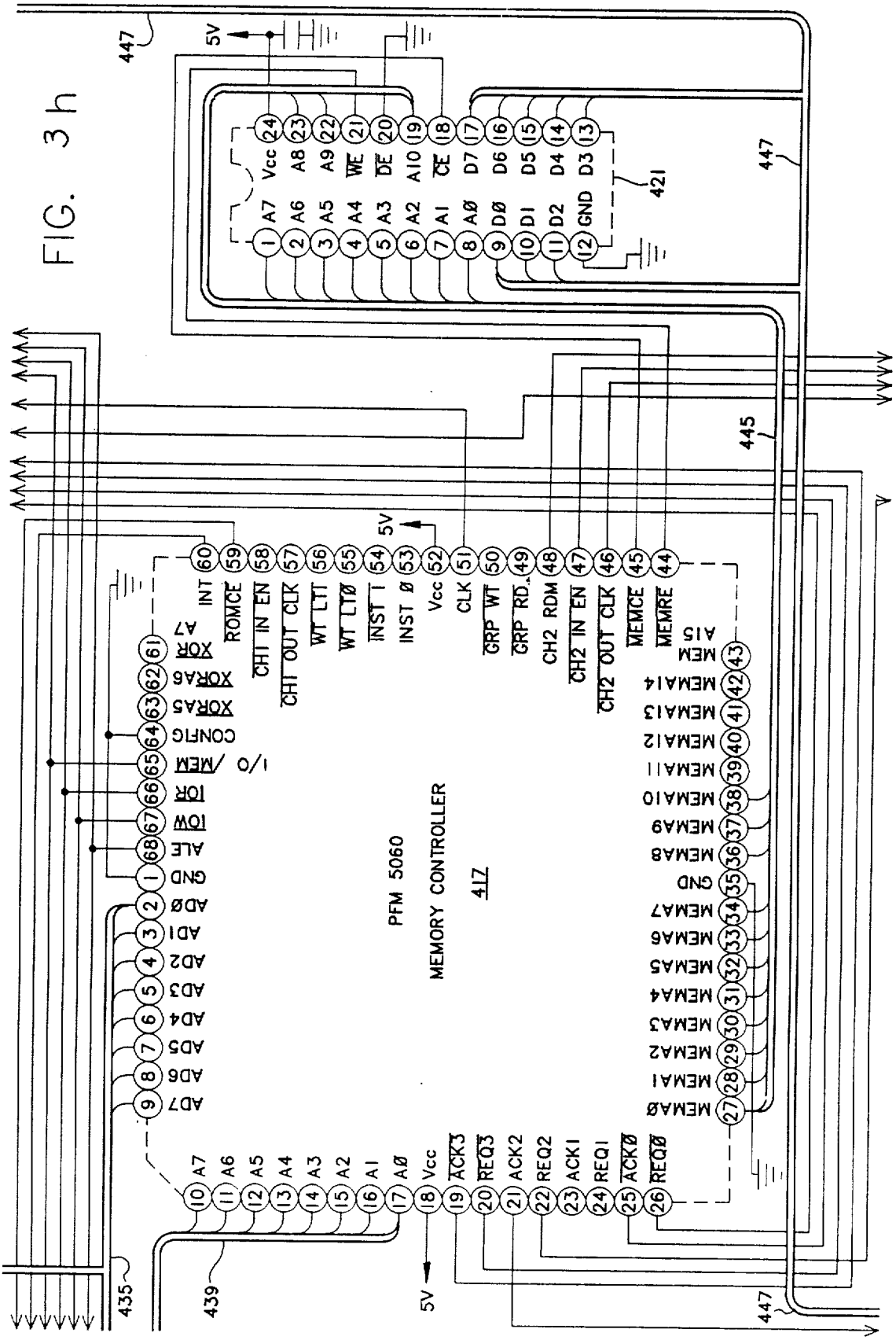
Figure 3I:
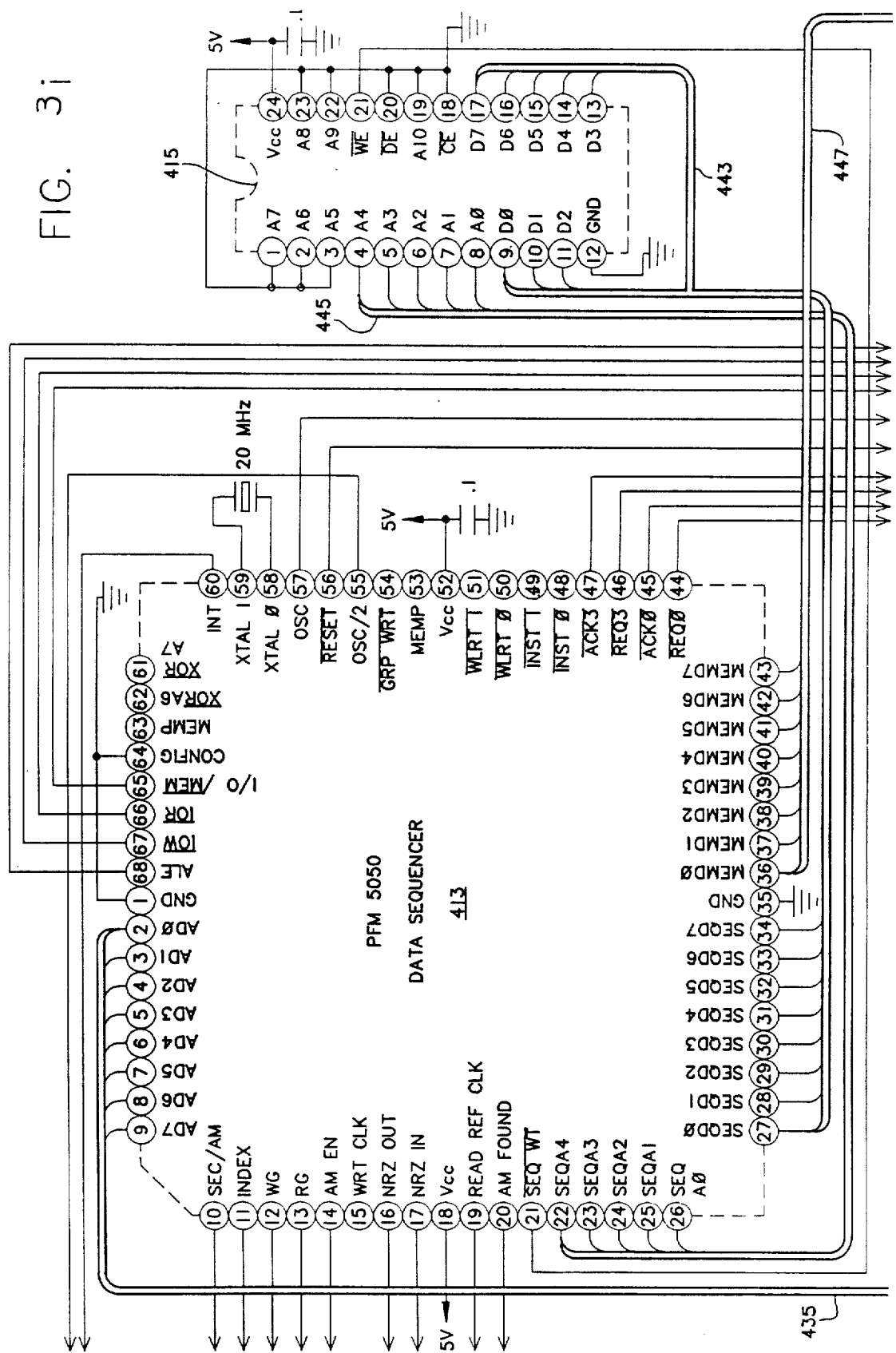

The analog/servo chip 385 and related circuitry converts digital values received from the microcomputer 381 into driving currents and applies these currents through bidirectional dribing amplifiers 519 and 521 to the winding 308 of the rotary actuator, symbolized in FIG. 2 by the broken line carrying reference numeral 300 and interconnecting a symbolic data transducer head 320, and the moving scale 112. The direction and magnitude of current passing through the coil 308 determines the direction and velocity of the head 320 in moving among concentric data tracks formed on the data storage major surface 214a of a single data storage disk 214. While a rotary actuator 300 is presently preferred, a linear voice coil actuator would also work satisfactorily with the control system of the present invention.

Storage Disk 214

The disk 214 (and disk 215 in a 20 megabyte version of the subsystem 31) includes two major data storage surfaces 214a and 214b coated with a suitable magnetic data storage material. Each data storage surface 214a,b provides storage room for a multiplicity of concentric data storage tracks, there being some 614 logical tracks available per data surface. Some 12 additional spare tracks are provided at the outer periphery of the disk surface 214a,b to be used in place of tracks having media defects, so that the first tracks required by the host's operating system for directory purposes will be free of any media defects, and thereby be reliable in all cases.

An inner landing zone region LZ is provided so that the ferrite slider head 320 comes into actual contact with the data surface 214a,b and subjects it to possible abrasion only in the landing zone region LZ. Each concentric data track nominally holds approximately 10,416 bytes, and is divided into eighteen data sectors, seventeen of them being for storage of useful data and one of them being held in reserve in the event that a media defect renders any one of the other seventeen unusable. Each data sector contains approximately 568 bytes, including 512 bytes of useful data and the remainder being sector address headers, error correction, speed tolerance gap fillers, etc.

An index marker 399, generated by motor driver circuitry 260 controlling a spindle motor 202, marks the location in time for a narrow, approximately 200 microsecond (130 byte wide), single servo sector 401 prerecorded with track centerline information for each data track upon one or more data storage surfaces 214a,b of the disk 214.

Figure 6:
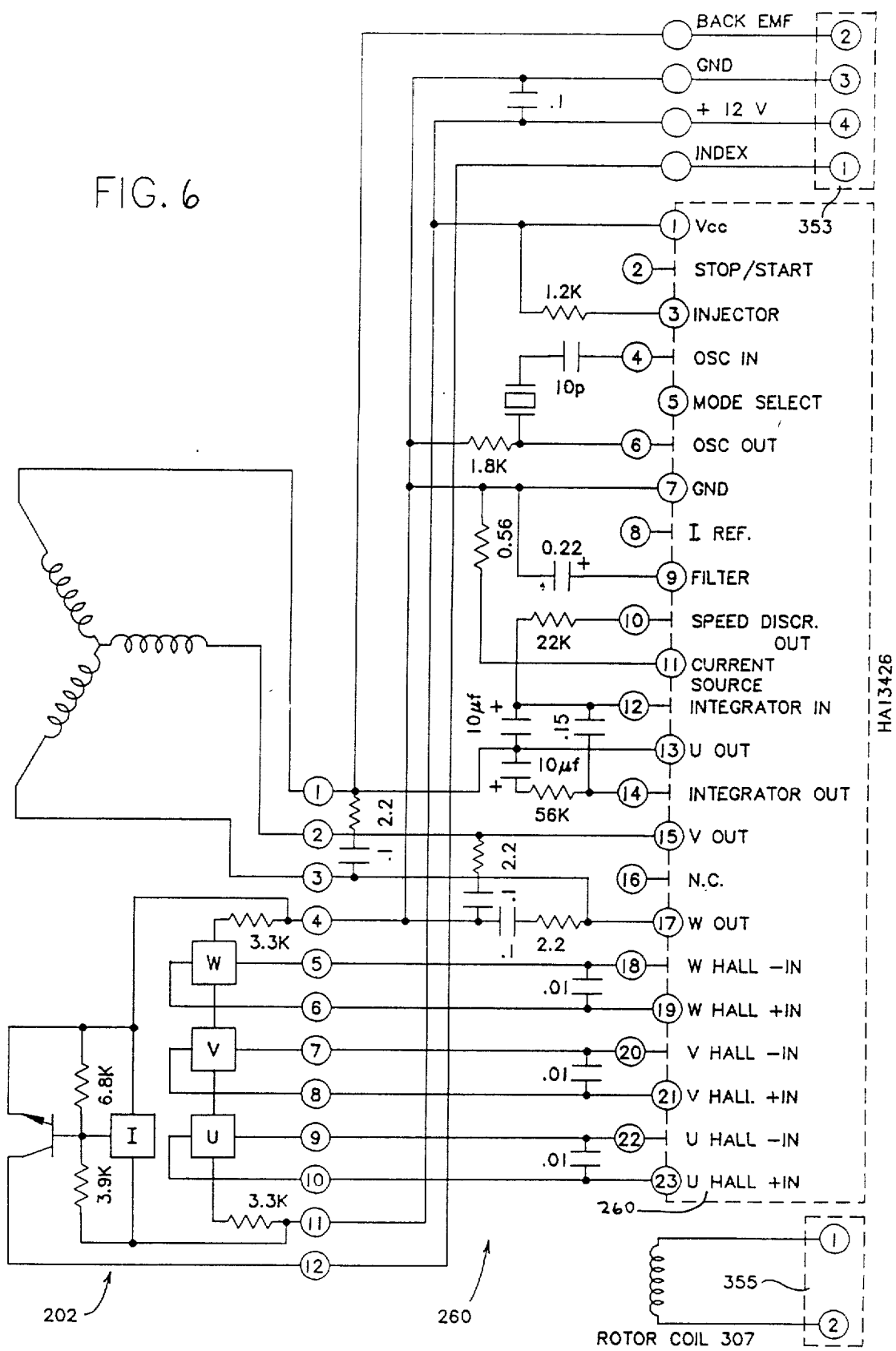
FIG. 6 is an electrical circuit schematic and block diagram of a spindle motor driver module externally mounted on casting of the head and disk assembly and which is plugconnectible with the circuitry shown in FIG. 3.

The disk 214 rotates at a substantially constant angular velocity, and the time period for each revolution is nominally 16.67 milliseconds. The motor driver circuitry is illustrated in FIG. 6 and includes an integrated circuit motor driver, such as type HA 13426, provided by Hitachi America, Ltd., 707 W. Algonguin Road, Arlington heights, Ill. 60006, or equivalent. This integrated circuit includes a flange which is directly mounted to the base casting for the head and disk assembly 39. The spindle motor 202 is Y wound and it generates three phase commutation signals by Hall effect transducers U, V and W responsive to a small permanent magnet in the armature of the motor 202, which are used by the integrated circuit to generate the necessary phases to drive the motor 202, as is conventionally known and understood.

A fourth Hall effect transducer X generates and puts out a once per revolution index signal on an index line. The microcomputer 381 monitors the index line from the motor control 260 and times the interval between each index marker 399 to be sure that the disk 214 is rotating at proper angular velocity, and it takes the subsystem 31 out of service in the event that disk rotation is determined to be improper.

Two radially offset, time staggered bursts are provided for each concentric data track within the servo sector 401. The transducer 320 reads the first burst and its amplitude value is sampled and sent to and digitized by the microcomputer 381. The transducer 320 then reads the second burst and its amplitude value is sampled and sent to and digitized by the microcomputer 381. Differences in the digitized amplitude values are used by the microcomputer 381 to calculate centerline offset correction values which are stored and combined with a digitized position value and then used to generate correction currents sent to the coil 308 in order to maintain the head 320 in centerline alignment with each track during track following operations.

The 614 tracks are divided into five contiguous zones, there being four zones of 128 tracks each and one inner zone of 102 tracks each. Track centerline data is acquired and stored for the tracks of each zone, and this data is used for initial correction whenever the actuator has placed the head 320 at a track within the zone. A zone timer is set for each zone, and times out after a predetermined interval, requiring that new centerline information for the zone be obtained before read/write operations will be permitted. These architectural features and operations of the fine servo loop and track zones are explained in further detail in the referenced U.S. Pats. Nos. 4,396,959, 4,419,701 and 4,516,177, the disclosures of which are hereby incorporated by reference into the specification at this location.

Aerodynamic Shipping Latch 98 and Electronic Return Spring 400

An aerodynamically released spring biased shipping latch 98 is defleted by airflow generated by rotation of the disk 214. This latch 98 includes a member which engages the rotary actuator 300, thereby locking the head 320 at a landing zone position whenever disk rotation is insufficient to generate an air bearing effect upon which the head 320 "flies" (in accordance with well-known Winchester technology).

In order to be sure that the actuator 300 returns the head 320 to the landing zone, an electronic return spring, symbolized by the switch 400 in FIG. 2 is provided in the subsystem 31. When power is lost or intentionally removed from the subsystem 31, this fact is sensed, and the operation of the spindle motor 202 is reversed: i.e. it becomes a generator, and the electrical energy it generates, due to the kinetic energy stored in the rotating disks 214, 215, is switched to the coil 308 of the rotary actuator 300. So long as there is disk rotation, the electrical energy generated thereby is sufficient to return the head to the inner landing zone LZ of the disk 214 and keep it there so that the spring-biased latch 98 reengages the actuator 300 and thereby retains the head at its inner landing zone. The dynamics of the latch 98 and the electronic spring return 400 are designed so that the head 320 is returned to the landing zone LZ in good time before the latch 98 reengages.

Further details of the aerodynamic shipping latch 98 are set forth in the referenced U.S. Patent No. 4,647,997 for Aerodynamic Latch for Disk File Actuator, the disclosure of which is incorporated into this specification at the present location.

A significant feature provided by the combination of the aerodynamic latch 98 and the electronic return spring 400 is that the bias force applied to the actuator by a conventional mechanical return spring (and which must be continuously overcome during disk file operation) is eliminated completely. This means that the actuator 300 operates with less power consumption, a consideration to be made when drawing all of the power of the subsystem 31 from the accessory socket of the personal computer host system.

Read/Write Channel

Figure 4A:
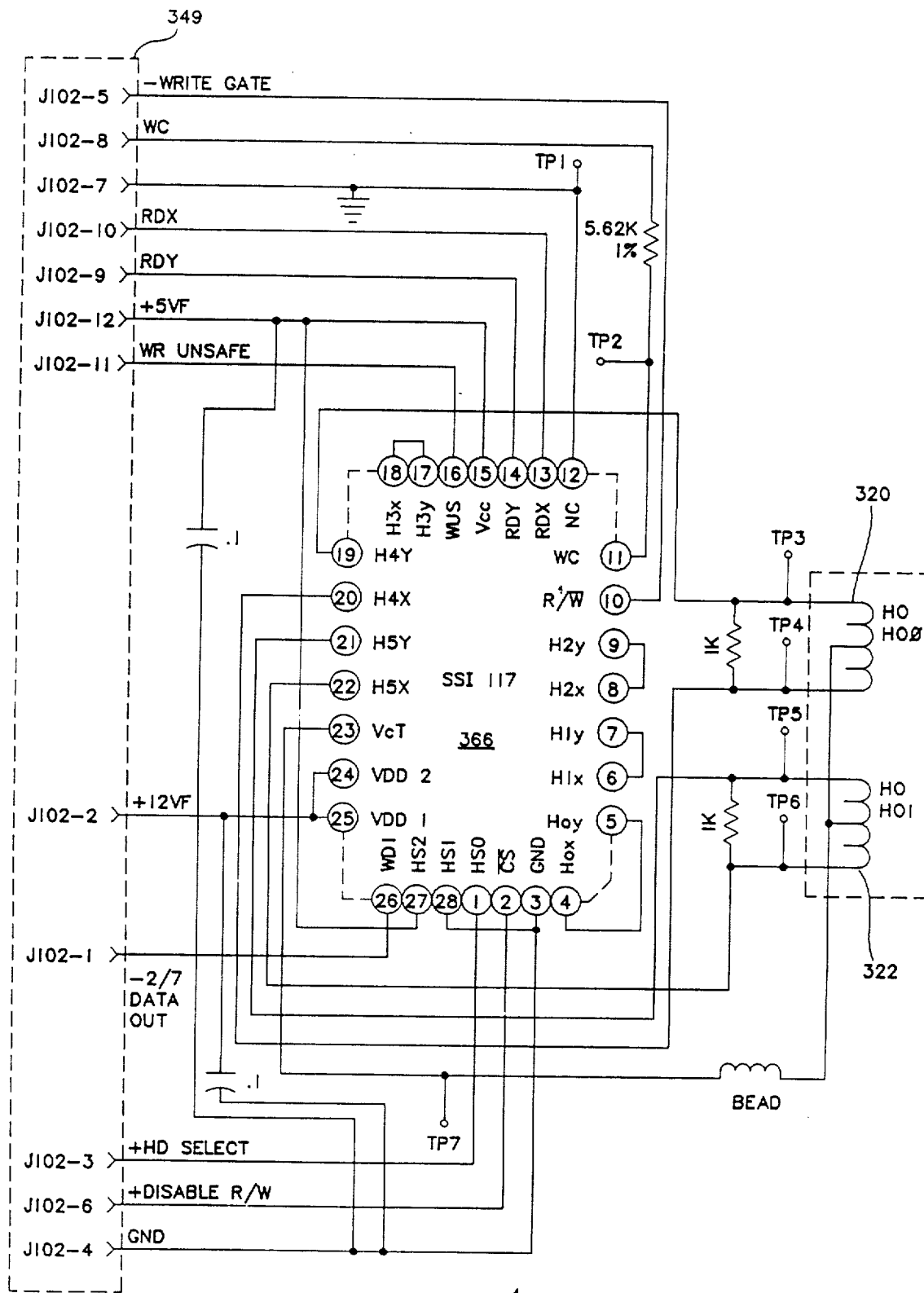
FIGS. 4A, 4B and 4C comprise respectively an electrical circuit schematic, block diagram and flexible circuit substrate for mounting and connecting a two channel monolithic read/write and head select circuit which is mounted within the head and disk assembly shown in FIG. 1, and which is plug-connectible with the read and write electronics depicted in detail in FIG. 3.
Figure 4B:
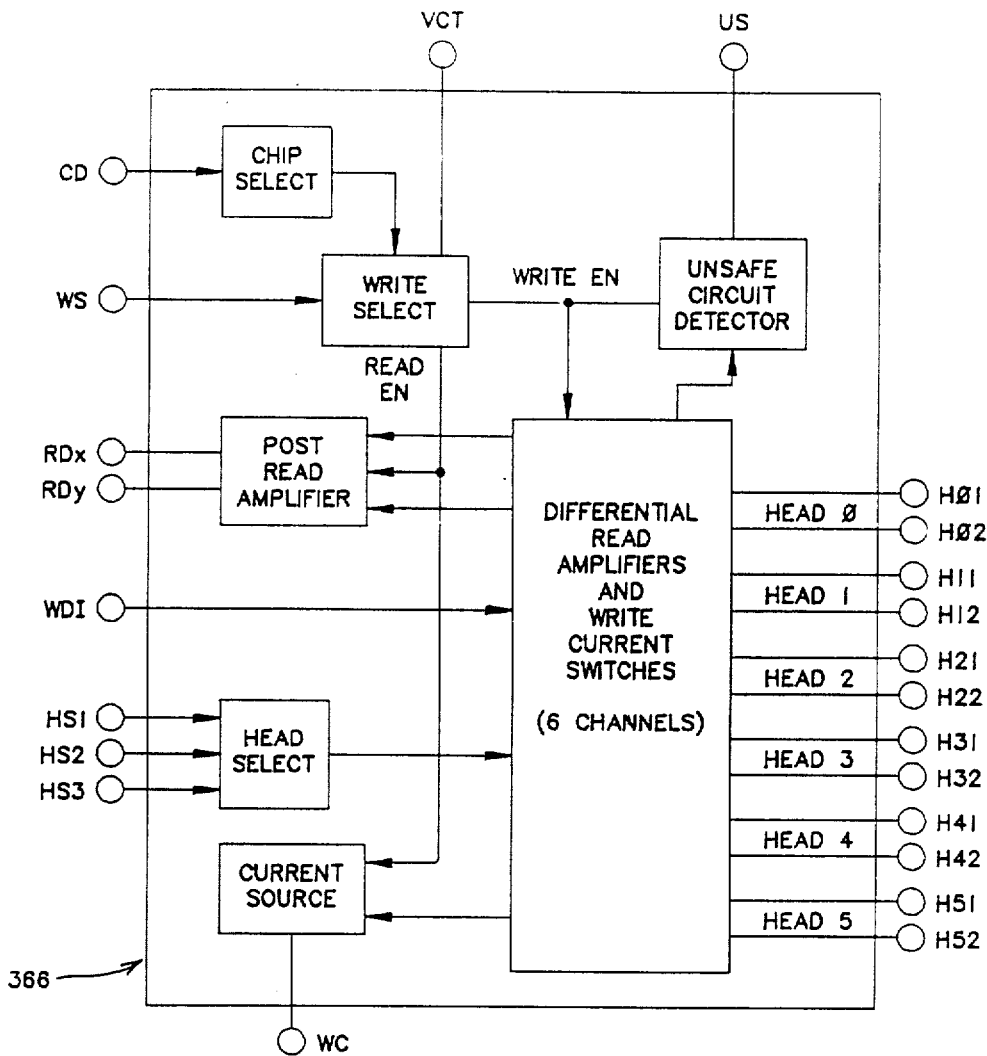
Figure 4C:
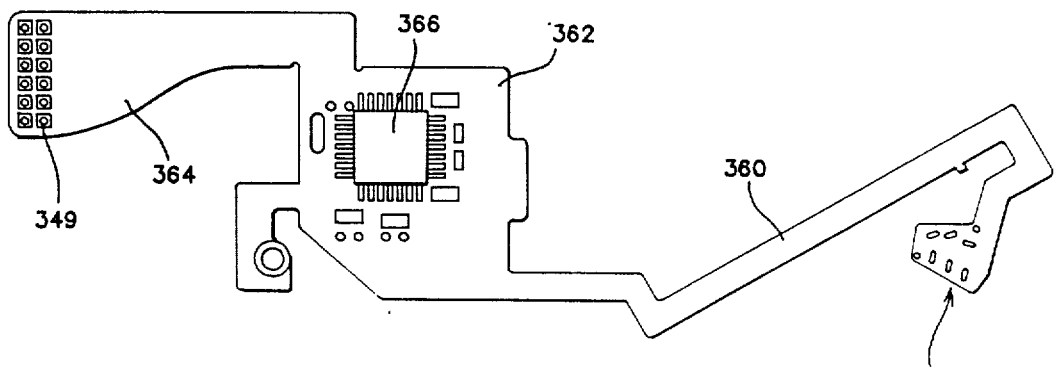

The overall read/write channel includes a head select and preamp circuit 366 which is carried on a flexible circuit substrate within the head and disk assembly 39 and which is described further herein in connection with FIGS. 4a, 4b and 4c. The channel also includes read/write electronics 409 schematically illustrated in FIGS. 3a, 3b and 3c, and a data separator 411, described hereinafter in connection with FIG. 11. The data separator 411 encodes and decodes the data bits to and from an encoding format, such as 2,7 code, which is used in the actual record and playback process on the disk storage surface 214a,b.

Controller/Interface

The controller/interface of the control system for the disk file subsystem 31 includes a programmable data sequencer 413 having its own data sequencer random access memory 415, a memory controller 417, an input-/output data buffer random access memory 421 addressed by the memory controller 417 for temporarily storing data sent from and to the data sequencer 413 and the data sent from and to an input/output channel interface 419.

A BIOS (basic input/output system) read only memory 423 is associated with the input/output channel interface 419, and it contains basic input output program routines which are accessed and executed directly by the host CPU whenever its operating system wishes to make use of the subsystem 31. Actually, the BIOS memory 423 is not required for operation of the subsystem 31, and its inclusion is a matter of convenience for the user, thereby enabling the subsystem 31 to be plugged directly into a personal computer host system without requiring the user to add any software driver routines to the operating system which are needed in order to use the subsystem 31.

The BIOS memory 423 may also include a collection of error and status condition routines which are used by the operating system of the host system to determine and indicate to the user the status and/or error condition of the disk file subsystem 31 from time to time. An eight bit tri-state bus driver 425 is interposed in a data bus between the BIOS ROM 423 and the input/output channel interface 419 and edge connector 365 so that the BIOS program routines from the ROM 423 may be transferred via the host bus to the host CPU and executed whenever the operating system addresses the BIOS memory 423.

System Buses

A control bus 431 extends throughout the printed circuit card 6. This bus, shown symbolically in FIG. 2 as a single line, is actually many different lines. Not all lines extent to all elements. For purposes of convention, unless a bus line is a data bus or an address bus, it is considered to be a control bus line. Thus, the data and address buses shown symbolically in FIG. 2 for ease of understanding and in more detail in FIGS. 3a through 3i define by omission each of the lines making up the overall control bus.

An eight bit unidirectional data bus 433 enables the microcomputer 381 to send digital actuator control values to the analog servo chip 385. Digital data passes over the bus 433 from the microcomputer 381 to the analog servo 385 wherein it is converted to analog values and sent to control the position of the rotary actuator during track seeking and following operations.

An eight bit time-multiplexed data and address bus 435 interconnects the microcomputer 381, the program memory 383, the data sequencer 413 and the memory controller 417.

A six high order bit (A8–A13) address bus 437 interconnects the microcomputer 381 and the program memory 383. The low order eight address bits (A0–A7) for the program memory 383 are sent by the microcomputer 381 over the data/address bus 435 during address time to the memory controller 417 where they are latched and held in order to be sent over an address bus 439 to address the program memory 383.

A five bit address bus 441 and an eight bit data bus 443 interconnect the data sequencer 413 and its dedicated small random access memory 415 which stores at most only 32 bytes.

The input/output random access memory buffer 421 is addressed via an eleven bit address bus 445 from the memory controller 417, while an eight bit data bus 447 connects the data sequencer 413 and the input/output channel interface 419 with the buffer memory 421. The buffer memory 421 provides temporary input/output data storage and functions as a sector buffer, holding a maximum of two sectors of data which are in the process of being stored or retrieved from the data surface of the disk 214, in addition to all status and control information which passes between the host and the subsystem 31.

A thirteen bit address bus 449 extends between the edge connector 365, the BIOS ROM 423 and the input/output channel interface 419; and, an eight bit data bus 451 connects the BIOS ROM 423 with the interface 419 and edge connector 365 via the tri state bus driver 425.

Data Sequencer 413

Figure 7:
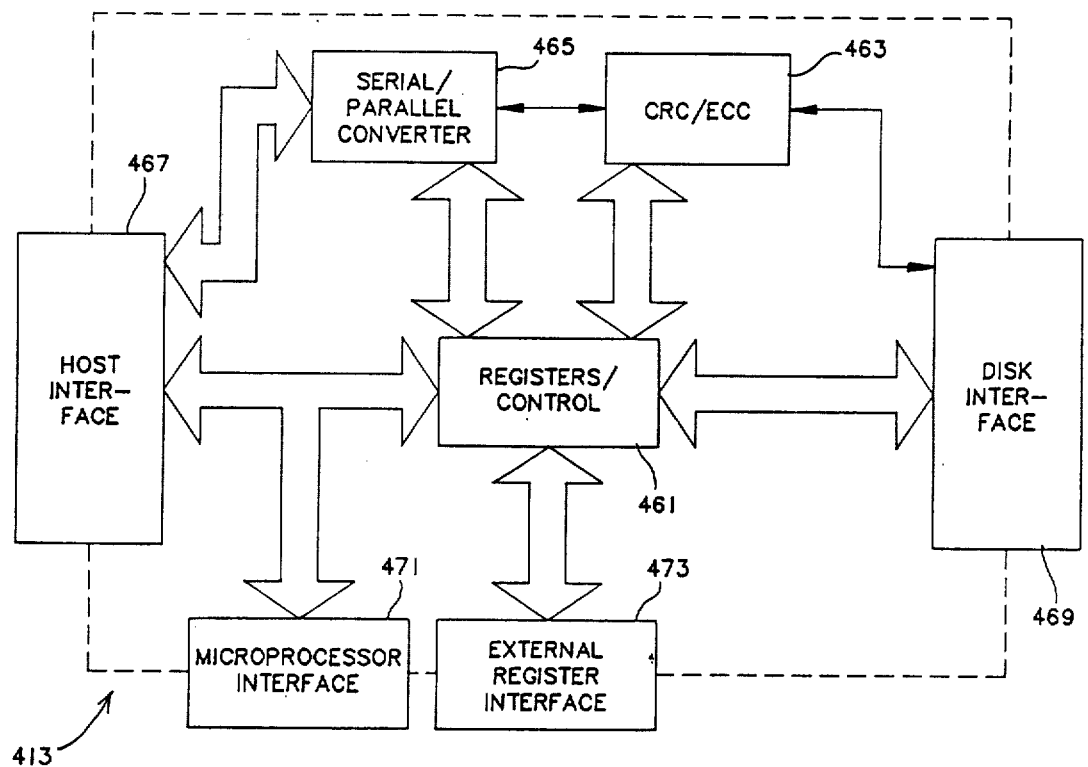
FIG. 7 is a block diagram of the structure of a data sequencer included within the circuitry shown in FIG. 3.

The data sequencer 413 is a monolithic large scale integrated circuit containing seven internal functional blocks, as shown in FIG. 7. These blocks include a registers/control logic block 461. This block 461 contains 32 eight bit internal control registers and associated control logic. The registers may be individually written to initialize the parameters that control data transfer, and individually read by the microcomputer 381 in order to obtain status information about sequencer command execution. This block 461 includes disk address registers for storing cylinder, head and sector identification data, status, etc., for the data block to be handled. The microcomputer 381 issues commands to the sequencer 413 by writing to these registers.

An error correction code/cyclic redundancy check logic block 463 generates and checks error correction code (ECC) or cyclic redundancy check (CRC) bytes appended to the data and identification fields respectively of each sector. This block eanbles use of either a standard CCITT 16 polynomial CRC or a programmable ECC. The particular polynomial may be up to 64 bits long and is determined at initialization time by values written into the registers/control block 461.

A serial/parallel conversion block 465 enables parallel data from the host to be serialized for the disk. This logic is implemented with high speed shift registers which effect the necessary format translation between parallel and serial data.

A host interface block 467 connects the sequencer to the buffer memory 421 via the data bus 447. The DMA memory controller 417 provides the addresses in the buffer memory 421 to which the data is to be transferred via the address bus 445.

A disk interface block 469 provides logic to generate and receive control signals such as read gate, write gate, address mark enable, etc., and it also passes the serial data to and from the disk via the data separator 411 and the read/write circuits 409 and 366.

A microcomputer interface 471 enables the microcomputer 381 to read and write the internal control registers of the block 461 to control operations of the sequencer 413 and to monitor its status.

An interface 473 to the external random access memory 415, via the address bus 441 and the data bus 443 provides access to 32 format parameter registers. These format paramter registers specify the size and content of the fields within each data sector on the disk. There are two registers for each field. One specifies the number of bytes in the particular field, and the other specifies the actual value contained in that field.

A monolithic integrated circuit, product code OMTI PFM 5050 Programmable Data Sequencer, available from Scientific Microsystems, Inc., 339 N. Bernardo Ave., Mountain View, Calif. 94043, is the presently preferred implementation of the data sequencer 413.

The function of the data sequencer 413 is to monitor the serial data stream coming from the data separator 411 in order to locate the precise sector of a track at which data is to be transferred. Once a sector address coming in from the data surface is determined by the sequencer 413 to correspond with the correct sector identification, data read or write operations are then carried out.

In the case of a read operation, the sequencer transfers the data from the correctly identified disk sector (512 bytes) to the sector buffer 421 where it may then be passed through the interface to the host. In the case of a write operation, the sequencer transfers 512 bytes of data from the host (stored in the sector buffer 421) through the write path and into the data region of the properly identified sector in the correct track on the selected disk surface 214a,b.

The sequencer 413 is preprogrammed to carry out these transfers on a single sector basis. The microcomputer 381 servos on track while waiting until the sequencer has completed its operation before it executes any other commands. Once the transfer of a sector of data is completed, a completion signal is sent by the sequencer to the microcomputer 381. The microcomputer 381 then checks status registers within the sequencer 413 to be sure that no errors have occurred. In the case of a read, the microcomputer 381 then programs the memory controller 417 to transfer the 512 bytes of data from the buffer 421 through the interface 419 to the host. The microcomputer 381 then continues to servo on track while waiting for that transfer to be completed successfully.

Memory Controller 417

The memory controller 417 is a low power monolithic integrated circuit for managing the flow of data between the data sequencer 413 and the buffer memory 421, and between the buffer memory 421 and the interface 419 and host computer. It controls the transfer of 512 byte blocks of user data stored on and retrieved from the selected data surface 214a,b, and it also controls the transfer of command and status bytes to and from the microcomputer 381. Fundamentally, the function of the memory controller 41 is to generate addresses which are sent to the buffer memory 421 via the address bus 445. It also resolves service request contentions during multiple block data transfers between the host and the subsystem 31, when data blocks are being moved through the buffer 421.

Three channels of the memory controller 417 are used by the subsystem 31, and word count registers and address registers are provided internaly for each of the channels. The microcomputer 381 programs the controller with the address from or to which data is to be transferred, the number of bytes to be transferred, and the direction of the transfer. With these parameters loaded into the controller 417, it then executes the transfer.

Figure 8:
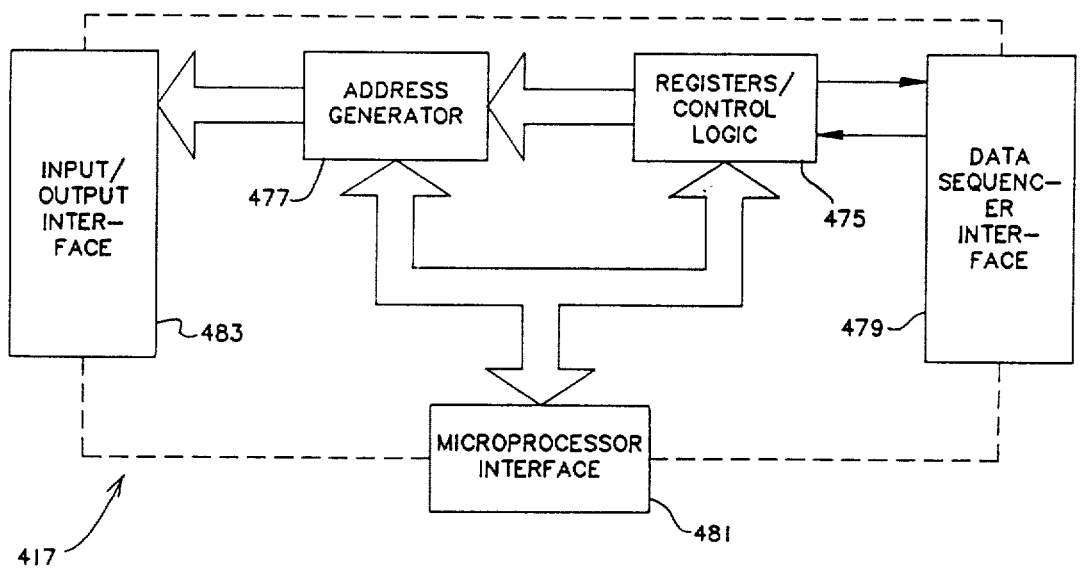
FIG. 8 is a block diagram of the structure of a memory controller included within the circuitry shown in FIG. 3.

FIG. 8 sets forth a conceptual diagram of the structure of the memory controller 417. Inside the memory controller 417 a registers and control logic block 475 contains the write and read registers for each channel. The write registers may be individually written in order to initialize the parameters that control data transfer. Read registers are available and may be individually read by the microcomputer 381 in order to obtain status information about data block movement command execution.

An address generator 477 generates and puts out addresses to the buffer memory 421 via the address bus 445. These addresses locate the data to be transferred to the disk via the data sequencer 413 or to the microcomputer 381 or to the input/output interface 419. In the event of a block transfer the address generator 477 operates automatically to increment the address value to point to the next location in the buffer 421 until the entire block of data for the selected sector is transferred.

A data sequencer interface 479 connects the registers and control logic block 475 with appropriate control lines of the data sequencer 413 via the system control bus 431.

A microprocessor interface 481 enables the microcomputer 381 to read status registers and to write the control registers in order to monitor and control block data transfers. The memory controller 417 also is used to demultiplex (latch) program addresses for the program memory 383 from the address/data bus 435, and these addresses, initiated under the control of the microcomputer 381, are applied to the program memory via the interface 481 and the address bus 439.

Finally, an input/output interface 483 enables the memory controller 417 to control the operations of the input/output channel interface 419.

A monolithic integrated circuit, product code OMTI PFM 5060 Four Channel Memory Controller, available from Scientific Microsystems, Inc., 399 N. Bernardo Avenue, Mountain View, Calif. 94043 is the presently preferred implemenation of the memory controller 417.

The memory controller 417 is preprogrammed to control the transfer of information, i.e. both data blocks and command and status bytes between the subsystem 31 and the host system. In this regard, the controller 417 handles and coordinates the passing data blocks and control and status bytes back and forth across the interface 419 with the host system. Once a sequence of control bytes has been received from the host, (typically six successive bytes sent to one of four predetermined logical ports to which the subsystem is programmed to respond), these bytes are then transferred to the microcomputer 381.

There is no data path directly between the microcomputer 381 and the buffer memory 421. In order for the microcomputer 381 to receive command bytes and to send out status bytes to the host via the buffer memory 421, it is necessary that such bytes pass through the data sequence 413. In order to write a byte to the buffer memory 421, the microcomputer 381 sets up the third channel of the memory controller 417 for writing and points to the address of the buffer 421 to which the byte is to be written. Then, the microcomputer 381 writes the byte to a register address within the data sequencer 413, and the byte is thereupon automatically transferred to one buffer address by coordinated automatic action of the sequencer 413 and the controller 417. A similar, but 2-step procedure is followed to move a byte of data from the buffer 421 into the internal random access memory of the microcomputer 381. A prefetch is used after setting up the controller 417 by the microcomputer 381 to place the first byte into the sequencer 413. A fetch is then used to move the byte from the sequencer 413 into the processor's internal random access memory. Fetches are then used to transfer all remaining bytes of the sequence.

The memory controller 417 passes data back and forth with the host on a byte by byte handshake basis. Once a block of data, usually a 512 byte sector amount, has been passed successfully, completion of the transfer is signalled to the microcomputer 381.

The host computer normally handles data block transfers from and to the subsystem 31 on a direct memory access basis wherein after the six command bytes have been passed to the subsystem 31, the host central processing unit (CPU) relinquishes the data bus and data is directly transferred into the active memory of the host under the control of a host memory controller. Byte-by-byte data transfers are used between the storage subsystem 31 and the host for command and status bytes on a programmed input/output basis, wherein such bytes pass through the accumulator register of the host. Such transfers may be used for data blocks but would take far more time and greatly impair the speed advantages normally associated with rigid disk data storage devices.

Input/Output Channel Interface 419

The input/output channel interface 419 is implemented as a special purpose low power VLSI monolithic circuit. This circuit 419 provides all of the circuitry necessary for interfacing the controller elements 413, 417, 381 and related circuitry of the Winchester disk subsystem 31 to the input/output channel bus of a selected host computer, such as the IBM Personal Computer TM. The circuit 419 provides a buffered data path to the host input/output channel, and it provides address decoding for access to eight host input/output address ports, address decoding for access to the external BIOS memory 423 via the buses 449 and 451, and circuitry for control of host bus interrupts and DMA transfers.

Figure 9:
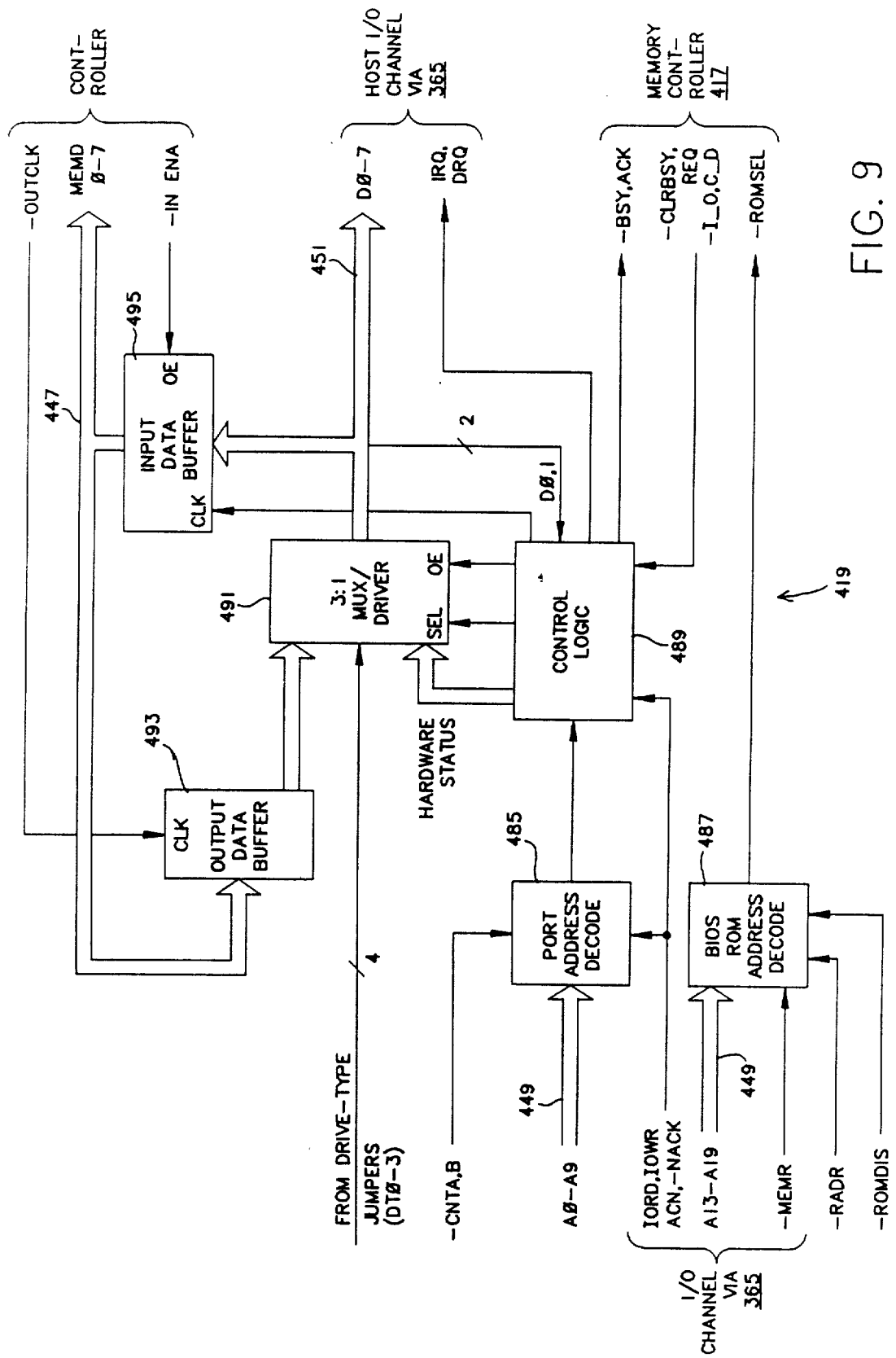
FIG. 9 is a detailed block diagram of the structure of an input/output channel interface included within the circuitry shown in FIG. 3.

As seen in FIG. 9, the circuit 419 includes a port address decode block 485 which decodes address lines A0-A9 from the host I/O channel in order to enable selection of eight input/output ports: four write ports and four read ports (of which only three are used). Two user accessible address select input pins -CNTA and -CNTB are provided to change the address range of the host's input/output ports to enable the use of multiple storage subsystems 31 in the same host personal computer.

A BIOS memory address decode block 487 decodes address lines A13 through A19 from the host I/O channel to give a ROM select signal -ROMSEL for enabling reading of the external BIOS memory 423. An address select input pin -RADR is provided to change the address range of the BIOS memory 423. An input pin -ROMDIS is also provided to disable decoding of the BIOS address entirely.

A control logic block 489 contains logic circuitry to control the host input/output port register reads and writes, data block transfers to and from the host and interrupts sent to the host. This block includes two internal flip-flops which control whether the host will be interrupted at the completion of a command, and also whether the transfer of data to the host will be by direct memory access through a host memory controller, or not. These bits are set by bits D0 and D1 of a control word written by the host into one of the write ports of the control logic block, and control the logic levels on an interrupt request line IRQ and a data memory request line DRQ extending to the host. A data acknowledge signal -DACK is received into the control logic block 489 from the host to indicate receipt of a data byte and thereby signal the readiness of the host to receive another data byte.

A 3:1 Multiplex/Driver block 491 enables one of three different host input/output read ports to be read on the host input/output channel by the host. These ports include an output data buffer 493 (Port 0) which latches data on the bus 447 from the buffer memory 421 and puts out the data to the host through the block 491 and the data bus 451 on a byte-by-byte handshake basis. The multiplex/driver block 491 also selects a hardware status register (Port 1) located in the control logic 489 which thereupon indicates to the host the state of the various control signals inside of the input/output circuit 419, and also a drive type register (Port 2), also within the control logic 489, which enables the host computer to read the value of four inputs which specify the type of disk drive in use. Although a fourth read port (Port 3) is available, it is not used by the subsystem 31. An input data buffer 495 latches data on the bus 451 from the host and puts out data to the buffer memory 421 on the bus 447 on a byte by byte handshake transfer basis.

Servo Circuit 385

Figure 10:
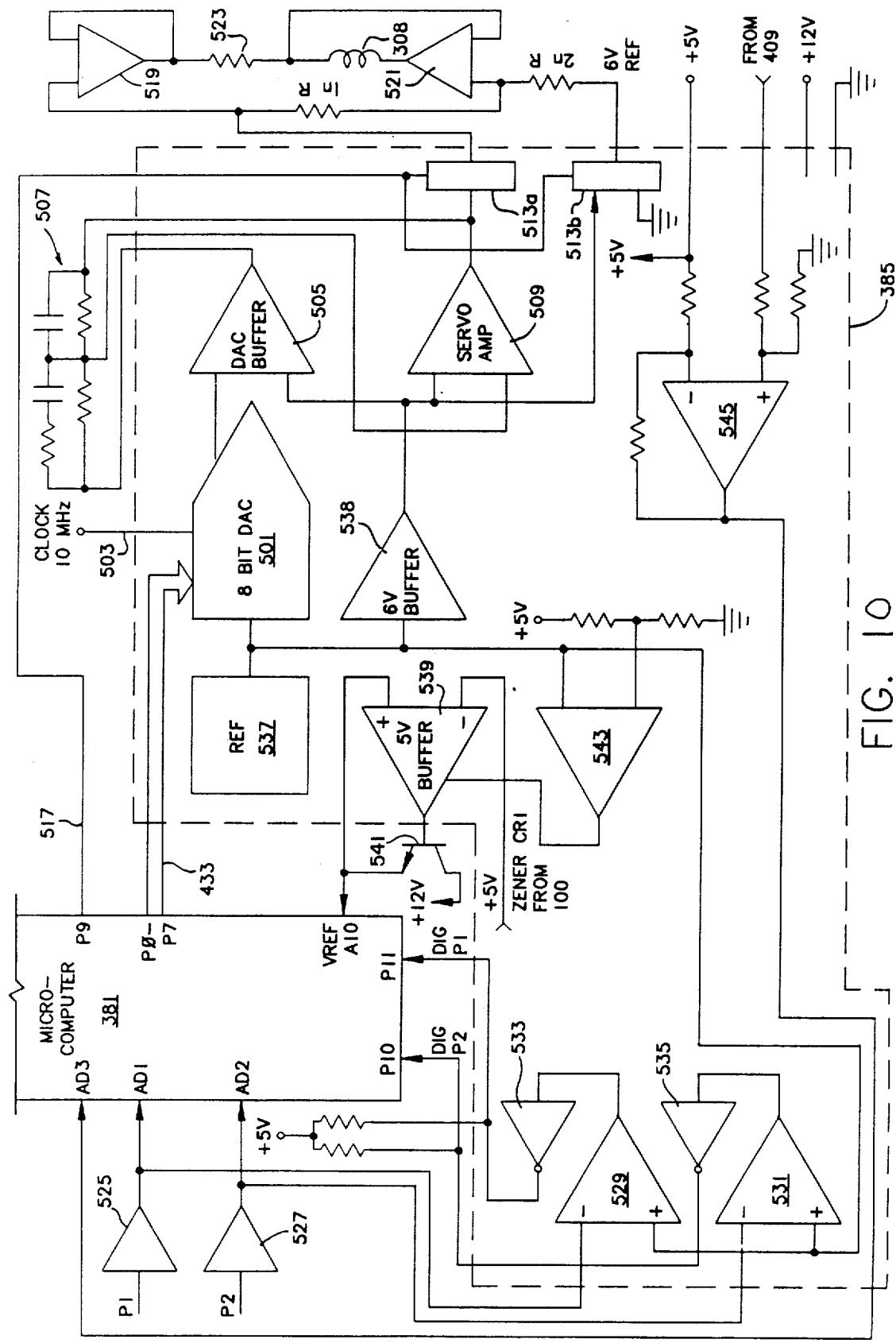
FIG. 10 is a detailed schematic and block diagram of the structure of an analog/digital servo circuit included within the circuitry shown in FIG. 3.

A low power monolithic analog and digital integrated circuit 385 is provided for the analog/digital servo circuit. Its internal architecture is depicted in FIG. 10. This chip 385 includes the circuitry required to carry out digital to analog conversions to provide control current to the actuator power drivers 519, 521 for track following and seeking operations. The servo circuit 385 also performs a peak detection function upon the read signal immediately following the index marker 399 when the head 320 reads the servo bursts. The peak detection function enables the microcomputer 381 to determine track centerline information from the radially offset, time staggered servo bursts.

The servo functions are carried out by sending an analog direct current through the rotor coil 308 of the moving actuator asembly 300. The direction (polarity) of the current passing through the coil determines the direction, whether in or out radially on the disk, of head movement. The electromagnetic motion of the head actuator assembly 300 is controlled by the microcomputer 381 which monitors coarse position information generated by the optical encoder assembly 86 and by the fine position information derived from the single servo sector 401 via the read and write channel.

FIG. 10 diagrams the circuitry of the servo circuit 385 within its environment of the microcomputer 381, optical encoder 86, and rotor coil 308.

Beginning with the eight bit servo data bus 433 from the microcomputer 381, digital data enters an eight bit digital to analog converter 501. The digital to analog converter is a switch-capacitor design and uses a 10 MHz clocking signal which is supplied over a line 503. The analog output from the DAC 501 is buffered in an operational amplifier DAC buffer 505 and then passes through an external phase lead filter 507 which provides servo loop phase compensation in combination with an internal track following servo amplifier 509. A switching circuit 513 operating in response to a signal from the microcomputer 381 via a servo off control line 517 enables current to be removed entirely from the rotor coil 308 under the control of the microcomputer 381.

Two external driver amplifiers 519 and 521 are used to drive current through the coil 308. A voltage (either the phase compensated output of the amplifier 509 during track following or the seek amplifier 511 output) is applied directly to the non-inverting input of the amplifier 519 and is applied to one end of a voltage dividing network comprising resistors having a two to one resistance ratio. A common node of the network is connected to the non-inverting input of the amplifier 521. The network is also connected at its other lower resistance end to a six volt reference voltage, so the actual voltage between three and nine volts put out to the amplifier 519 is proportioned about the reference voltage when it reaches the input of the amplifier 521.

For example, when a three volt potential is applied to the amplifier 519, three volts appears at its output. At the same time a four volt potential appears at the input and output of the amplifier 521. A one volt difference is then present across a ten ohm sense resistor 523. A one volt drop across the 10 ohm resistor 423 creates a current flow of 100 milliamps which passes through the rotor coil 308 from left to right in FIG. 10, and causes it to move the actuator assembly 300. When the voltage at the input of the amplifier 519 is e.g. nine volts, only eight volts appears across the amplifier 521, causing a 100 ma current in the opposite direction to flow.

The voltage drop across the resistor 523 is sensed by both amplifiers 519 and 521 at inverting inputs thereof, and is used, in combination with the control voltage applied to the non-inverting inputs, to control the magnitude and direction of current passing through the coil 308. The driving amplifiers 519, 521 supply a maximum of approximately 100 milliamperes to the coil 308, in either direction of current flow.

Two current to voltage converters 525 and 527 in the optical encoder subassembly 86 convert the light-induced phase currents P1 and P2 into analog voltages. Outputs from these converters 525 and 527 enter microcomputer 381 analog to digital conversion ports and also enter the servo circuit 385, as shown in both FIGS. 2 and 10. Two comparators 529, 531 in the circuit 385 monitor the P1 and P2 voltages and develop digital track crossing signals which are returned to the microcomputer via two inverting amplifiers 533, 535, also inside the circuit 385. By generating the digital track crossing signals, the microcomputer 381 is able to monitor coarse head position during track seeking operations more efficiently than if it has to convert the P1 and P2 signals to digital values first.

A voltage reference element 537 provides a reference voltage to appropriate nodes of the circuit elements within the chip 385 as shown in FIG. 10. A six volt buffer 538 provides a reference six volts to each of the DAC buffer 505 and the servo amplifier 509. The six volt reference enables the DAC to be varied in its output in a range between three and nine volts over 256 equal increments.

A five volt zener reference from the optical encoder assembly 86 passes through a buffer amplifier 539 and an external transistor 541 before being put into the reference voltage input Vref of the analog to digital circuit within the microcomputer 381. When the zener voltage from the encoder 86 drifts with temperature changes, these small changes are also tracked by the digital to analog converter of the microcomputer 381.

The analog servo chip 385 works primarily with a twelve volt power supply, while the microcomputer 381 works with a five volt power supply. A comparator circuit 543 monitors the five volt bus within the servo chip 385. If the five volt reference is lost at the chip 385, the comparator 543 shuts off the buffer 239, thereby preventing the microcomputer 381 from becoming damaged because the Vref port is being forced to ground potential. It should be noted in this regard that all of the outputs of the servo circuit 385 leading directly to the microcomputer 381 are open collector or are output protected, so that the micrcomputer 381 is thereby protected against the failure of the chip 385 or any of its elements.

The chip 385 also includes a detector amplifier 545 which is directly connected to the read/write channel in order to receive the sector servo bursts prerecorded in the single servo sector 401. The peak voltage levels of the read/write channels are translated by the amplifier 545 into levels more suitable for the analog to digital converter input port AD3 of the microcomputer 381, driven by the output of the amplifier 545.

Optical Encoder Circuit 86

As depicted schematically in FIG. 5, an integrated circuit (U1) contains four operational amplifiers U1A, U1B, U1C, and U1D. The amplifier U1A is a current to voltage converter and functions as the P1 amplifier 525. It has an inverting input connected to the anode of the upper photocell P1 of the photodetector array 124. The amplifier U1B is also a current to voltage converter and functions as the P2 Amplifier, having an inverting input connected to the anode of the lower photocell P2 of the photodetector array 124. A negative feedback circuit comprising a capacitor C4 and a resistor R12 adjusts the frequency response and gain of the P1 converter U1A, and a similar but adjustable network of capacitor C3 and series resistors R9 and R10 adjusts the frequency response and gain of the P2 converter U1B.

A reference voltage Vref is derived from a 12 volt supply bus from the host computer through a network comprising a series resistor R3 and a 5.0 volt zener diode CR1. The zener regulated 5.0 volts is applied to the non-inverting input of an operational amplifier U1C. A resistance network of resistors R2 and R1 provides at a common node a feedback path to an inverting input of the amplifier U1C and a reference voltage Vref which connects to the common cathode substrate of the photodetector array 124 via a connector. The values of the resistors R1 and R2 establish the voltage present at the output of the amplifier U1C. This output voltage is supplied to two adjustable networks: the first network comprising the resistors R16, R17 and R18 for controlling the operation of the converter U1A, and the second network comprising the resistors R13, R14 and R15 for controlling the operation of the converter U1B. Resistors R18 and R15 are individually adjustable so that the electrical characteristics of the photocells P1 and P2 respectively may be individually controlled and equalized in terms of voltage output over the range of light to dark. These two adjustments R18 and R15 also enable each photocell P1 and P2 of the encoder 86 to be trimmed and to accomodate the particular gap between the scale 112 and and the masked detector array 124 without loss of current amplitude between the maxima of light and dark conditions at each photocell.

An automatic gain control (AGC) cell of the array 124 is connected to an inverting input of an operational amplifier U1D via a connector. The non-inverting input of the amplifier U1D is connected to a driver transistor Q1 which in turn supplies current from a 5 volt bus of the host equipment to the anode of the LED light source 118. The cathode of the light source 118 is connected through two current limiting resistors R4 and R5 to ground. A series network of resistors R6 and R7, in combination with the current put out by the AGC photocell controls the current put out by the operational amplifier U1D and actually applied to the LED 118 through the driver transistor Q1.R6 is adjustable to control quiescent current through the LED 118.

Data Separator 411

Figure 11:
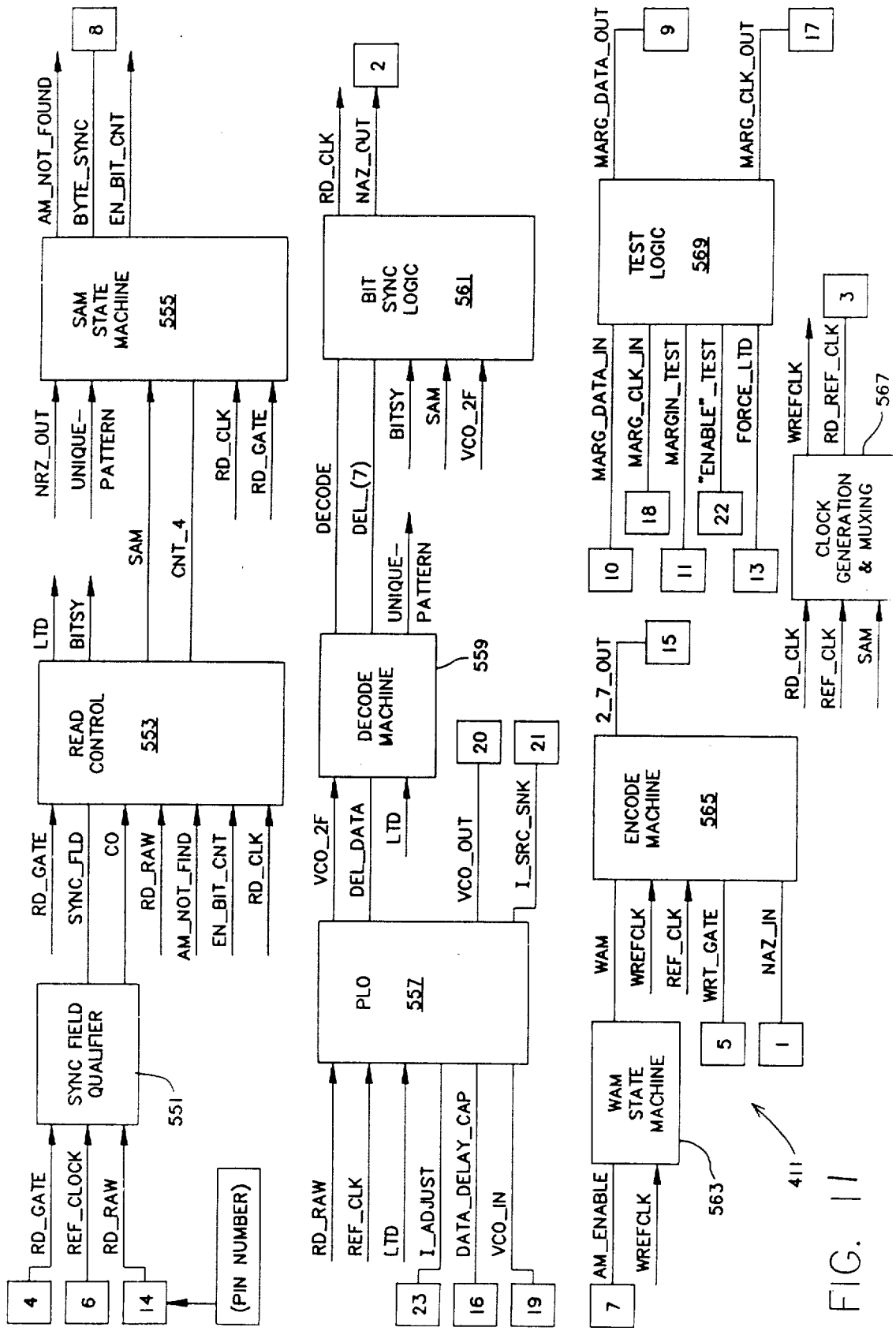
FIG. 11 is a block diagram of a data separator element included within the circuitry shown in FIG. 3.

The data separator element 411, preferably formed as a monolithic integrated circuit, such as type OMTI 20527 available from Scientific Microsystems, Inc., 339 N. Bernardo Avenue, Mountain View, Calif. 94043, or equivalent, is depicted in FIG. 11. The data separator 411 performs three functions.

First, the data separator 411 determines head position relative to the data format. This task is accomplished by writing a special pattern onto the data surfaces 214a, 214b, commonly referred to as an address mark pattern, which can be identified when a read operation is initiated. The separator circuit 411 generates and writes the address mark pattern while formatting each data track, and it identifies the address mark when a read operation is begun.

Second, the data separator 411 defines bit cell boundaries on the disk data surface. This task is accomplished by a phase locked oscillator (PLO). The PLO constructs a data clock signal which precisely defines bit cell boundaries as they exist in the formatted data track. Essentially a flywheel oscillator with inertia to average out minute fluctuations in disk speed, the PLO constantly updates the phase and frequency of the data clock signal throughout each data read operation.

Third, the data separator encodes and decodes non return to zero (NRZ) data to a format more suitable for being recorded on the media as a series of magnetic flux transitions, due to constraints peculiar to magnetic recording phenomena. One suitable format is 2,7 code, and the data separator 411 handles the code conversion.

The monolithic data separator circuit 411 as shown in FIG. 11 includes a sync field qualifier circuit 551. This circuit 551 inspects the frequency of incoming pulses from the read electronics 409. The output of the circuit 551 is a logical one or zero, depending upon the frequency of the incoming pulses. For example, if the pulses are separated by less than 204 nanoseconds or more than 602 nanoseconds, the output will be low. If the pulses are separated by greater than 300 nanoseconds and less than 492 nanoseconds, the output will be high, indicative that a sync field is validly present in the raw data stream. Only if the sync field is valid will the PLO be permitted to lock onto incoming data.

This circuit 551 is also used to reset a read sequence. A search for the address mark cannot be initiated until the sync field is valid for eight bytes of data. Only then may a read sequence progress if the sync field falls to zero. If it does before the consecutive eight bytes are received, the read sequence is automatically reset. This mechanism protects against write splices. For example, data having a dexadecimal value of 33 encodes to one pulse every 800 nanoseconds, which will force sync field low. A field of hex 33 is written on either side of a five byte field in the format where write splices may occur. This forces the read sequence to be reset upon entering the write splice and coming out of it. This is important, because over time, write splices could form into any pattern of data including hex FF data and an address mark. However, by making the correct sequence greater than five bytes and forcing a reset of the read sequence on either side of the write splice, a false address mark cannot be generated.

A read control circuit 553 povides a mechanism to discover where the data transducer head 320 is located relative to the data format of a track being read, and to lock the PLO to the disk data. The control circuit 553 includes a four bit asynchronous counter, three state holding flip flops and various decoding logic, A Lock to Data (LTD) signal forces the PLO to phase lock to the read raw (RD RAW) pulses coming from the read channel 409. A bit sync (BITSY) signal enables the decoder to block incoming encoded bits for correct decoding. A search for address mark (SAM) signal enables another state machine 555 to determine whether an address mark is present on the disk at the precise moment, or not. The appropriate action is then taken by the SAM circuit 555.

The phase lock oscillator 557 defines the bit cell boundaries as they exist on the formatted disk during a read operation. The PLO 557 comprises a phase comparator, a filter and a voltage controlled oscillator (VCO). The phase comparator compares the phase of the encoded data read from the data surface 214a,b with the VCO signal. It then supplies a current via an ISRCSNK pin whose duty cycle is proportional to the phase difference between the two signals. The filter requires external passive components to provide phase compensation to the phase lock loop, to attenuate the high frequency components of the ISRCSNK signal, and to convert the current into voltage. The VCO is a voltage to frequency converter which provides the decode machine with a bit rate clock of the same phase as raw data. The frequency is determined by the filtered ISRCSNK signal.

A decode machine 559 and a bit sync logic block 561, taken together, are the heart of the data separator. They take in encoded data, such as in 2,7 code format, or another suitable format, from the read channel 409, decode such data and put it out as NRZ data in phase lock with the read clock RD_CLK signal. There are two code bits for every one NRZ data bit, and the code bits must be blocked together correctly before they may be decoded. The bit sync logic block 561 determines correct blocking of encoded bits in response to a valid bit sync signal (BITSY) as generated by the read control circuit 553.

A write address mark state machine 563 generates the write address mark signal (WAM) at a specific time related to the address mark enable signal AM_ENABLE. The WAM signal is used to invert two adjacent code bits. This alters a correctly encoded byte of data into a unique pattern which is not generated by the encode logic because of the encoding rules of the particular code employed. This pattern serves as the address mark.

An encoder machine 565 converts NRZ data from the data sequencer 413 into encoded data in accordance with the selected encoding scheme, whether it be 2,7 code or some other satisfactory code. Encoding operations are carried out whenever the write gate line (WRT_GATE) is enabled. When the write address mark signal WAM is asserted, code bits are inverted. Code bits are synchronized to the reference clock signal REF_CLOCK provided from the data sequencer 413.

A clock generation and multiplexing circuit 567 contains the circuitry required to divide the reference clock signal by two in order to generate a write reference clock WREFCLK signal. This signal is required for the encoding operation of the machine 565. The multiplexer in the circuit 567 steers one of two inputs to a read reference clock output RD_REF_CLK which goes to the data sequencer 413. During a read operation, the read clock signal $RD_{13}$ CLK (which is synchronous with the NRZ data put out by the bit sync logic block 561) is passed to the data sequencer 413 to synchronize it with the NRZ data stream.

A test logic block 569 enables special tests to be carried out on the data separator chip 411. Such tests include holding the LTD line high in order to measure loop parameters of the PLO 557. Also, data may be delayed from the disk with respect to the bit cell in order to perform window margin testing. Ant the time lag between two internal signals may be changed in order to optimize the setup time on the phase comparing flip-flop.

Disk Format

Figure 12:
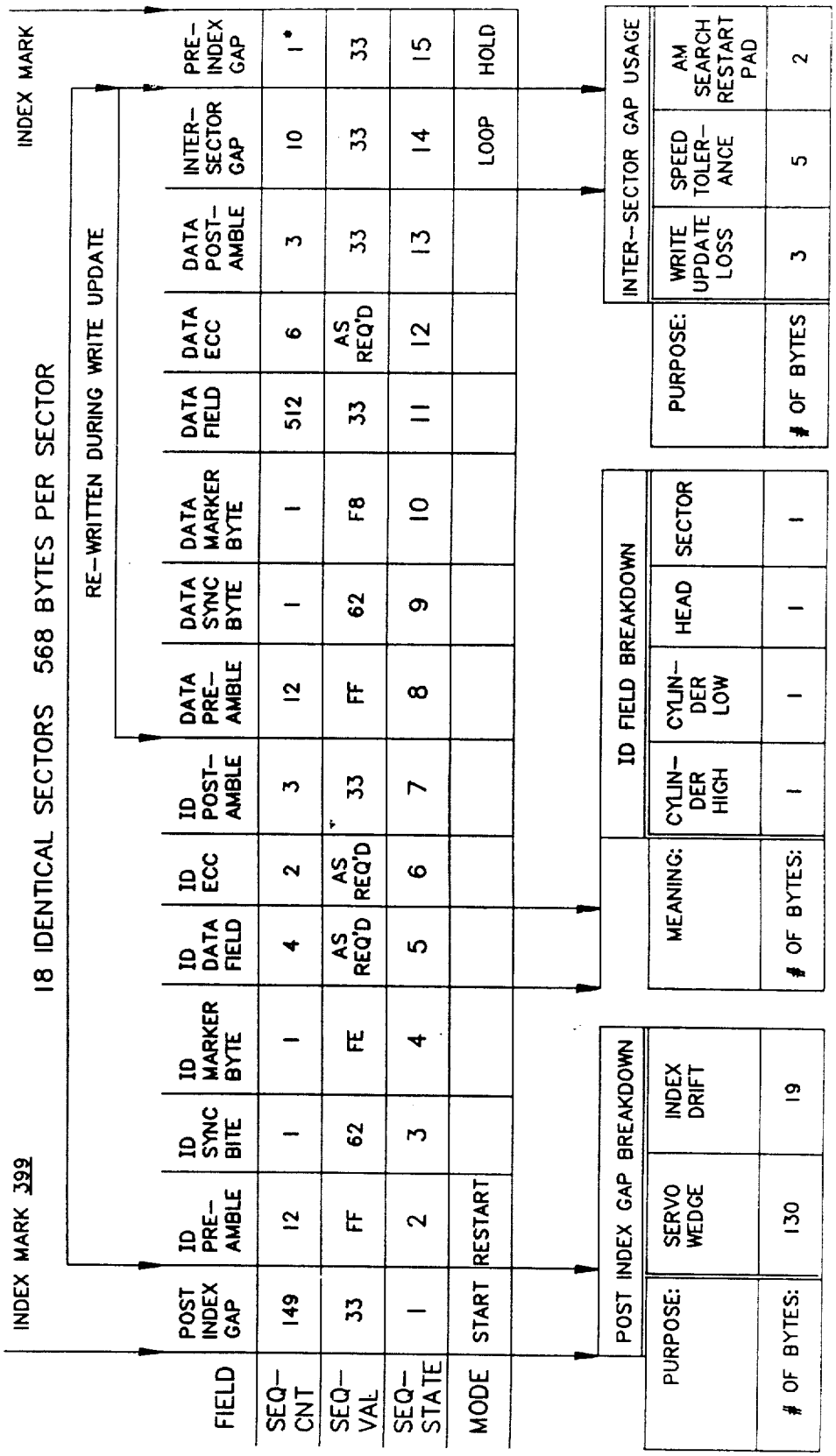
FIG. 12 is a diagram of track formatting followed in the disk file subsystem depicted in FIG. 1.

A format arrangement for the subsystem 31 is depicted in FIG. 12. Therein, eighteen identical sectors are provided following the index mark 399 and the post-index gap which contains the wedge servo bursts and a tolerance region for index drift. An ID preamble contains 12 bytes of hex FF data. Its purpose is to synchronize the PLO 557 before the data sequencer 413 reads the ID DATA FIELD. The hex FF pattern is used because it provides the highest frequency read pulses of any single byte repeating pattern. Its length allows for two bytes of PLO sync detection before locking the PLO, five bytes of PLO sync time, one byte of phase set time and four bytes for margin.

An ID SYNC BYTE is the single address mark byte for each sector. It is made unique by violating the encoding rules otherwise carried out by the encoding machine 565. The resultant unique pattern is known to, read and checked by the data sequencer 413 in order to validate the particular sector ID.

An ID MARKER BYTE is a byte of hex FE data, chosen only to be different from the DATA MARKER BYTE. The data sequencer 413 uses this byte to determine that a sector ID data field is about to be read.

An ID DATA FIELD includes four bytes holding the sector address in the form of cylinder high, cylinder low, head and sector.

An ID ECC field of two types of CRC information are used by the sequencer 413 to check the validity of the sector address.

A three byte field ID POSTAMBLE of hex 33 data is provided to guarantee a stable read clock from the PLO during the time that the last bits of the ID ECC field are read, decoded by the decoder 559 and passed to the sequencer 413.

A DATA PREAMBLE field duplicates the ID Preamble field, and its purpose is to synchronize the PLO before reading the data field.

A DATA SYNC BYTE serves the same purpose for the data field as was served by the ID DATA SYNC BYTE for the ID data field.

DATA MARKER BYTE is a byte of hex F8, used by the data sequencer 413 to determine that a data field is about to be read.

DATA FIELD. This field is for storing a block of 512 bytes of user data.

DATA ECC is a six byte field for data error correction code.

DATA POSTAMBLE is a three byte field of hex 33 data and guarantees a stable read a clock from the PLO during the time that the last bits of ECC are being read, decoded and passed to the sequencer 413.

INTERSECTOR GAP is a ten byte field of hex 33 data containing three functionally separate sections. A three byte write-update field allows for the data preamble and data field to move down the track by up to three bytes between a format operation and a write update operation. This shift is accounted for by the data format encode and decode delays, a one byte sequencer delay and a number of single bit resynchronization delays. A five byte speed tolerance gap allows for a plug and minus point four percent (0.4%) speed variation of the spindle motor 202 to be accommodated between track format operations and write update operations (a 0.8% maximum difference). Finally, a two byte pad guarantees at least two bytes of hex 33 data before the ID Preamble of the next sector. This forces the PLO sync field detector to restart the address mark search sequence even if it has falsely detected some PLO sync data from write splices in the speed tolerance field.

PREINDEX GAP is a 43 byte field of hex 33 data at nominal spindle motor speed. Its purpose is to allow for motor speed variations during track formatting. An overspeed of up to 0.4% may be accommodated.

Control Software

The microcomputer 381 operates essentially in an interrupt driven mode. There are several inputs to the microcomputer 381 for setting its internal interrupt request flags. All interrupts are software maskable, except a nonmaskable interrupt line which may be operated by the host operating system (write to Port 1), in order to reset the subsystem 31 should it become lost (hung up) during command execution. The host reset operation is flagged through the BAR NMI port, pin 25. All other host commands are initiated by an interrupt which is flagged through bit position 3 of Port C, (BAR INT2, pin 20), which may be software masked if some task having a higher priority is in a critical phase of execution.

There are three main phases of software execution: Initialization, Main Loop, and Command Execution.

The initialization phase, at power on (or upon an NMI host RESET command) resets and/or preloads all of the control registers with initial or default values required for proper operation of the data sequencer 413, the memory controller 417 and the head and disk assembly servo system. The operating parameter registers within the microcomputer 381 are also cleared and set with initial or default parameters. Once the subsystem 31 is set up, the microcomputer 381 seeks to track zero and enters the main loop.

The main loop is essentially an idle mode for maintaining the status quo. A track following servo value generated by the microcomputer 381 is latched into and converted to an analog voltage by the digital to analog converter 501 and is converted to a current which passes through the rotor coil 308 to keep the heads 320 centered on track. A phase byte selects which phase, whether P1, P2, BAR P1, or BAR P2, should be used for servoing on-track. (P1 and P2, being in quadrature, logically define four adjacent track locations and boundaries). In the main loop, the microcomputer 381 creates a tight on-track servo loop about the selected phase signal. The selected phase is digitized and read, and the servo loop is updated, approximately every 90 microseconds. The analog to digital conversion process requires approximately 48 microseconds, and the digital processing and update requires the rest of the 90 microseconds, the time duration for main loop execution. This updating of the track following servo continues repeatedly until an interrupt occurs. It is expected that approximately 95 percent of the useful life of the subsystem 31 will be spent in executing the main loop.

There are three main interrupts which cause the microcomputer 381 to exit the main loop. The first interrupt is an Index Interrupt, which occurs once each revolution of the disk 214. The prerecorded A and B bursts in the servo wedge 401 are read sequentially and peak amplitude sampled through the analog to digital converter within the microcomputer 381. The two amplitude values are compared, and any difference value is used in a computation to provide an error correction value which is combined with the digitized selected phase value from the optical encoder to derive the correction value sent to the digital to analog converter 501. At the completion of the servo routine at Index, the microcomputer 381 returns to the main loop.

Another interrupt is a RESET operation from the host which is generated by the host's operating system in the event that the subsystem 31 fails to respond to other host commands. The Reset operation creates a hardware interrupt in the subsystem 31 and forces it to reinitialize. In this manner, if the microcomputer 381 gets out of sequence in executing commands, error recovery, if possible, will be accomplished.

A third interrupt is a SELECT Interrupt which is generated by the host computer when it sends a Host Command to the subsystem 31. Each command received by the microcomputer 381 is compared with a table of valid commands. When a matchup occurs, the table provides an address for a command execution routine in the program memory 383 which corresponds to the particular valid command received from the host. If no matchup occurs, the command is rejected as invalid. Ordinarily, when a command is received, the microcomputer 381 is interrupted, and jumps to, and begins executing the command routine for the particular command. At command completion, the microcomputer 381 returns to the main loop.

A Timer Interrupt occurs every 150 microseconds during seek operations which are carried out in response to a select interrupt which requires a seek operation.

There are a number of Host Commands which may be given to the subsystem 31. The following Host Commands are representative of the types of commands likely to be sent by a host to the subsystem 31 in order to carry out useful data storage and retrieval operations.

TEST DRIVE READY which is a check to see if the subsystem 31 is ready to receive another command, or to see if it is e.g. seeking or otherwise unavailable. The subsystem 31 puts out an error message to the host in the event that it is not ready.

REQUEST SENSE STATUS which is invoked to send four bytes of a sense block which characterizes current status of the subsystem 31. This command requires the subsystem 31 to be set up to transfer the four bytes; the bytes are placed in the buffer 421, and then they are sent to the host via the interface 419. The microcomputer 381 waits until the host signals receipt as a command completion. Any error conditions are sent to the host in response to this command.

READ ERROR LENGTH. This command sends the host a one byte burst length of the last ECC error. It requires a setup for a one byte transfer via the buffer.

INITIALIZE DRIVE CHARACTERISTICS. This command enables the host to initialize the characteristics of the subsystem 31. The memory controller 417 is set up to transfer eight bytes of data from the host through the buffer 421 and into the internal RAM of the microcomputer 381. This information includes the maximum number of cylinders (track locations) and heads. Also, the maximum ECC data burst length is stored.

FORMAT TRACK. This command enables the host to format a single track. The track address is checked to be sure it is legal; the sequencer 413 is set up for formatting; the format track command is sent to the sequencer; and a "bump detect" function is monitored throughout the formatting operation. (The Bump Detect Routine is used to detect whether any physical impulse has jarred the subsystem 31, causing the head to move off of track centerline alignment. This routine calls for monitoring the selected servo phase put out by the optical encoder 86 is closely as possible (75 microsecond loop) during the format operation. If a bump is detected, the one track format operation is automatically repeated.)

FORMAT DRIVE. This command is invoked by the host in order to format all of the host-accessible storage capacity of the subsystem 31. It includes carrying out the FORMAT TRACK command for all of the data tracks, beginning with the track specified in the command and continuing through track 611.

READ DATA. This command enables the host to receive the data from one or more specified number of sectors. A legal starting address is checked. Then, the actuator is commanded to move the head transducer from its present track location to the target or destination track. After the seek, the memory controller 417 and the data sequencer 413 are set up for operations at the destination track, and a command byte is sent to the sequencer to start data transfer operations. The microcomputer 381 waits until the sequencer 413 finishes reading the proper sector at the destination tract. Errors are checked for, and the microcomputer 381 waits until the host memory channel is ready to receive the data commanded. The transfer process to the host is then initialized in the memory controller 417 and the transfer to the host is carried out.

If there are additional sectors to be transferred to the host, the next address is generated and loaded into the sequencer, and the sequencer is then restarted. This process goes on until all of the data is transferred to the host. If the operation requrires access to sectors in adjacent tracks, automatic single track stepping (and head switching) is commanded at the appropriate time by the microcomputer 381. When all sectors have been transferred, the command is completed and the microcomputer signal command completion to the host.

WRITE DATA. This command follows the same progression of steps as are followed for the READ command, with the exception that data is received from the host over the interface 419 and via the buffer memory 421. The microcomputer 381 moves the selected head to the correct track location. The first block of data is transferred from the host to the sector buffer 421. The sequencer 413 begins reading sector headers. When the right sector is located, the sequencer transfers data from the buffer 421 through the write channel, so that it is recorded in proper time and position in the data area of the sector. This process is carried out for each sector, until the command is completed. During the writing process, the microcomputer 381 while waiting for a command completion signal constantly performs the bump detect routine, to be sure that writing is inhibited in the event that a bump is detected. If a bump is detected, the sector is rewritten after the head and disk assembly has stablized.

Other Commands. There are a number of utility commands (such as a SEEK which is not a part of a READ or WRITE command) which may be provided to carry out certain tests and operations desired by the host. These commands are a matter of design choice and are routinely understood in the art and are not essential for successful operation of the subsystem 31. For this reason, they are not described herein.

Command Structure and Addressing

Every command which is sent to the subsystem 31 by the host is six bytes long. The first byte is a command code to identify the type of command, and the succeeding bytes provide the necessary parameters to carry out the command. Then, typically a block of sector data (512 bytes) is sent to or from the subsystem depending whether the command was a write or a read command. Other commands are the Initialize Drive Characteristics command which transfers eight bytes of data from the host to the subsystem 31, the Request Sense Status command which transfers four status bytes from the subsystem 31 to the host, and the Read Error Length command which transfers one byte from the subsystems to the host.

After the subsystem 31 has completed each command, the microcomputer 381 sends out a one bye command completion signal to the host, of which only two bit positions are used. The first bit indicates drive number (whether drive number zero or one) and the other bit indicates whether or not an error was detected during command completion within the subsystem 31.

All communication between the subsystem 31 and the host system is carried out across eight ports: four input ports and four output ports of the host system. The ports are paired together, so that for example port 0 which is at a single logical address is one port in its input mode and in its output mode is another port. All data transfer is via port 0. All hardware status information is transferred from the subsystem 31 to the host system via port 1. The host reads the status port during data exchanges so that it may synchronize its operations with the state of the subsystem 31. For example, it looks at the request bit of port 1 before sending each command byte.

Port 1 has very different meanings in read and write modes. In the read mode port 1 enables the host to read the hardware status lines of the subsystem 31. The lower four status bits of port 1 are used to carry out a handshake control for each byte of data transferred between the host and the interface 419 of subsystem 31. The busy bit (3) is set by the subsystem 31 whenever it is in the process of executing a host command. For example, the busy bit is set by the subsystem 31 when the host selects it for an operation (a write to port 2) and remains set until the command completion byte is sent to the host via port 0 at the completion of execution of a host command, whereupon the busy bit of port 1 is cleared.

A control/data bit (2) indicates the status of the data bytes being transferred via port 0, whether control bytes or data bytes. An input/output bit (1) indicates whether the data at port 0 is output from the host or input to the host from the subsystem 31. (Output, if user data, corresponds to a Write command; Input, if user data, corresponds to a Read Command). A request bit (0) enables a byte by byte transfer handshake control. The setting and clearing of this bit coordinates the transfer of each byte between the host and the interface 419, during non-DMA data transfer operations as when command bytes are being sent.

A write operation to port 1 by the host generates a reset signal which results in a non-maskable interrupt of the microcomputer and a reinitialization of the subsystem 31 under host operating system control.

Port 2 is used by the host to read a drive type byte which may be used to indicate to the host which type of peripheral is attached to the host system. This byte may be polled, for example, by the host to determine storage capacity size, in the event that the storage capacity of the subsystem 31 is increased e.g. to 20 megabytes by the addition of another data storage disk 215.

A write to port 2 generates a controller select pulse which sets a flip-flop within the Input/Output Interface 419 which has an output line -BUSY. This line interrupts the micrcomputer 381 when a command from the host has been received at the interface 419. To start a command sequence, the host writes to port 2, causing the -BUSY line to become true. This event is detected by the microcomputer 381 and it leaves the main routine and begins a command execution routine. At the same time, the host monitors the subsystems hardware status port 1. As soon as the host sees the busy signal being asserted (true), the command/data (C/D) line being asserted (true), the input/output line not being asserted (not true), and the request line being asserted (true), it knows that the subsystem 31 is ready to receive the first command byte. The first byte is then written to port 0 by the host and is temporarily stored in the input data buffer 495 of the I/O interface 419. An ACK signal is then sent to the memory controller 417, telling it that the first command byte is in the buffer 495. The memory controller 417, drops the request signal, generates a Memory Enable signal, and the byte is then transferred to the buffer 421 and stored therein at an address commanded by the memory controller 417. The memory controller then raises the request signal again, thereby signalling the host to send the next command byte. This procedure is followed until all six command bytes are stored in the buffer 421. They then go to the microcomputer 381 for execution, and at the completion of execution a command completion byte is latched into the output data buffer 193 read by the host at port 0.

Port 3, the fourth port, is not used as a read port. It is used as a write port by the host to enable/disable DMA operations and interrupts sent to the host from the subsystem 31. Thus, the host may write to port 3 before every command so that it may specify to the subsystem 31 whether the host expects to be interrupted at the end of the command, and whether the command to be executed will use block transfers by DMA if it is e.g. a read or write command.

EXAMPLE 1

The subsystem 31 is in the main loop, servoing on track. The host operating system will write to port 2 which will create a signal -BUSY which is an interrupt to the microcomputer 381 and which causes it to exit the main loop. The microcomputer 381 enters an interrupt service subroutine which will cause the memory controller 417 to raise the Request bit in order to obtain the first command byte via port 0. When the host writes the command byte to port 0, an acknowledge signal is sent to the memory controller 417 causing it to lower the Request signal and temporarily store the byte in the buffer 421. The Request bit is again raised, and the next byte is received across the interface 419 in the same manner and stored in the buffer 421. The handshake via the Request bit of the status port 1 continues until all six bytes of the host command have been received and stored in the buffer memory. The memory controller 417 is preprogrammed so as to expect to handle a reception of the six command bytes. Completion of reception of the six command bytes is signalled to the microcomputer 381, whereupon it transfers the six bytes from the buffer 381 to its own registers via the data sequencer 413 as already explained and decodes the command by comparison with a list of valid commands in a look up table stored in the program memory 383. Once the command is decoded, the microcomputer 381 jumps to the routine necessary to carry out that command. In the event that the command received does not correspond to any of the valid commands listed in the lookup table, an invalid command error message is returned to the host. At the completion of execution of a command, a command completion acknowledge signal is returned to the host. The occurrence of any error known to the subsystem 31 occurring during command execution is also signalled to the host, and it can then test the status of the subsystem in an attempt to learn what type of error occurred.

EXAMPLE 2

One critical operating situation arises in the situation where the first host command received by the system is a Seek command, and the very next command received is a Test Drive Ready command. During the fastest portion of the seek, the microcomputer 381 has to receive, process and complete the command by returning a status byte to the host, while simultaneously monitoring track to track crossings of the head and actuator structure, all in such a manner that the actuator does not become lost. In order to carry out this worst case operating scenario, the processing task for processing the incoming command from the host is divided up into several segments. The microcomputer 381 accomplishes the segments in the very little time available between the track boundary sensing and calculations which are required to maintain control over head position during the seek. The microcomputer 381 in effect begins to process the incoming command, and goes as far as it can with the process until it is time to leave it and to sense the track crossing and increment (decrement) the track counter. Then, the mirocomputer 381 returns to the task of processing the incoming command until the next time interval elapses for monitoring track crossing.

The seeking algorithm employed in the subsystem 31 is interrupt driven by a timer. It is a position algorithm, rather than a velocity or acceleration algorithm. Every 150 microseconds during track seeking, the microcomputer 381 is interrupted and carries out a Seek routine. It looks at the digital P1-P2 phases to see how far the actuator has progressed in that fixed time intreval, i.e. how many tracks have been passed over by the head during that time; and, it updates the tracks traversed register and checks actual location of the transducer against a loop up table containing a power acceleration curve which contains expected position data. Finally, it adjusts the acceleration of the actuator 300 to bring head position into correspondence with expected head position stored in the look up table.

For example, if the head 320 has crossed 20 tracks by the end of the interval, and the look up table says the head should have crossed 25 tracks by that time, the acceleration (current through coil 308) is increased to catch up. If the actuator 300 is four tracks off of the target track location stored in the look up table, the actuator 300 will receive a maximum torque value (maximum current will be passed through the coil 308). At the completion of the Seek command, the actuator 300 will be permitted to settle at the target track.

Since the optical encoder 86 is capable of separately identifying each one of four tracks, the timer interval must be selected in relation to the maximum head actuator seek velocity, so that the head will not move more than three tracks during the time interval. If it were to move four tracks, a hopeless ambiguity would arise, making it impossible for the microprocessor 381 to update the track count register and to calculate the current correction value.

Here follows an object code listing of a control program which actually carries out the operations described hereinabove in a subsystem constructed in accordance with the presently preferred subsystem 31 as described. In this listing, in Tektronics format, each horizontal line represents a separate record. The slash mark is the beginning of each record. The first two hexadecimal bytes correspond to the address of the first byte of the record. The third byte corresponds to the hexadecimal count number of data bytes in the record. The fourth byte comprises an eight bit sum of four bit hexadecimal values for the six digits which make up the address and byte count. The last byte of the record in an eight bit check sum of the four bit hexadecimal digits comprising the program data bytes. All bytes between the fourth byte and the last byte of each record are program data bytes.

Having thus described an imbodiment of the invention, it will now be appreciated that the objects of the invention have been fully achieved in realizing a microprocessor controlled rigid disk file subsystem, and it will be understood by those skilled in the art that many changes and widely differing embodiments and applications of the invention will suggest themselves without departing from the spirit and scope of the invention. The disclosures and description herein are purely illustrative and are not intended to be in any sense limiting.

```
/000003033477C017
/0004030754120100
/0008040C1011AA211A
/00100506549CFF010441
/0018040D69014E622A
/00201E11B04CE3404D13A0AA62436F707972696768742031393835205040555532C443A
/003E1E2065762E20436F72702E484454E8166419086807112EF68FF6407FF6406FF83
/005C1E2004FFFFAA40940154D8004844549FFF64011D688071126EF68FFAA626EFF69B1
/007A1E20007101058A63006400806401546900400269004003640200697F4DD469081B
/00981E204DD169084DD01068FF04FFFF7102003402FF2403FF6BFC31716E047172047E
/00B61E20141006701EB3FF341300488334C0FF489371020840E61440A7150502F76427
/00D41E204A084F7E6406FF344700703E9DFF690063646363654843006407E7AA4063
/00F21E2017134095116A020158570148224147020640CC260CAC6E84CC260CAE369023F
/01101E114F6C5B02C2AA62690358024F6148440004FFFF6409F36419044405004CEF5B
/012E03140B4FA72F
/01311E14000104050607080A0B0C0D0E0FE0E3E4E5E6E7E8E9EAEBECEDEEEFF0F1F203
/014F1E23F3F4F51F037F0452042606D503D20397055406A60F5B034A03BC03A303B244
/016D1E2302AE02FB02DD05B206390AAC0AD809FD09AE08ED08F40A4F0BCB0AA10B1BA4
/018B1E230AEB09DD08E50875093466FF71B005401106409F740A7014011020B700E45
/01A91E23A2FF656603542B03346EFF55672034726FF48007015E003436FF01693D016864
/01C71E231A4835483548350703300167073F3D0A073F3B016A63817172034520114E
/01E51E233101016648857E94828123070F66920150304347255067346EFF709B3B5B
/02031107700FA2FF644A08B804FFFF54D00040301E1
/02141E160167072017025A0307FD636C44000040000C346CFF71800040210C656603FD
/02321E164E1D3471FF5567203475FF2436FF2C3F2C22482A4831483148317709E3F2A7A
/02501E163B4088026C0358586C01147E0F5F03141990F5B021402006DEE69ED64190B5E
/026E1E25707912804829707D12806409F36419040503FB44050040EF0BB8703F83FF4C
/028C1E25693340CB0B71800F3466FF40210C3483FF48836910704114000874ED44103D
```

```
/02AA041A064893B831
/02AE1E29407B0CB8407B0C6406FE6AFF40CE026A0040CE026406FFBB6406FF6930548C
/02CC1E29F501340000693340CB0B2428804400080A3A3274FFFB340000693140CB0B1E
/02EA1E292428804400082A2A60FA4FD03274FFF7B8407B0C403D136406FE340000444C
/03081E1A00206900709332774FFFA633F6406FF6700B8693154F501407B0C5502018847
/03261E1A690854F50144030040000C718003346EFF5567203472FF40210C69ED707937
/03441E1A128040020FB8407B0C44000040000C718000349BFF4FE2407B0C440700400E
/03621E1AEF0B69EF707912804020F34A4FF71800740110C01A4634801A5634701A64C
/03801E1A634901AB370C69086387408A1501A71801AB1934320174EF44C8004BA4343A
/039E1E294AFF4893BB407B0C44FF0140C50B340000703E7AFF69EF40D60540020FB864
/03BC1E29407B0C44FF0140C50B703F7AFF69ED40D60B40020FB8715E80402A0C409FB0
/03DA1E290F40ED0C717604402C1240F41240E50D146004701E9DFF6409FE583A64195D
/03F81E29014843006407F7340003693140E40B69067079208063640680E4E11644916
/04161E1A014E0C6409FE30764FC1690154F501407508718110713900717660A69316A2D
/04341E1A0240160740680ECF67004E04644901C76409FE30764FE62039308I4FDDB85E
/04521E1A402A0C409F0F40DB0340070EB8F8C0C0B0401713483A690740E1146409FE53
/04701D194017137069228057F06407FFA0AA62407B0C056BF85C024E877176043445
/048D1E28A000703E85FF40AE0CD3406705F85502084E2E15020840A7150502F7B84047
/04AB1E287414405708400014703F3DFFA7340000703E3BFF74EFB83076C1C8409F0F6B
/04C91E28402C124FBE40380540741414FBFF408505346009703E85FF40491235A5C04C
/04E71E28C6406705F54E22404912011A474B8A5C6406705F34E1340741414FFFF408559
/05051E1905402C124074144000148005020EF403805014C585C66900595869FF634F32
/05231E19014C555801C669FF59586900635014F6FF408505B80502FD342003400AC114C
/05411E196700D015020240E0114059054D0E01140590586905547E00205B05580301E4
/055F1D27505858014F6356B8716700716A1471690140F2083485FF48B3691470612C
/057C1B24489314000074EDB9B84400003438FF4895A54893400014409F0FB8E2D
/05971E24402A0C409F0F719B0044FF0140720840900869336A1940160740680EC5402A
/05B51E242E07C1F045030840020F703F7AFF69ED40D60B3081C440020FB840FEOD546B
/05D31E24780C017B1604637B4FCC402A0C409F0F44030275666E544050240720840903F
/05F11E240869336A0940160740680EC5402E07C1F04503084002O0F703F7AFF69ED404F
/060F1E24D60B3081C440020FB840FE0D547B0C017B1604637B4FCC402A0C409F0F7167
/062D1E249B0044FF0140720840900869336A19401607406B0EC5402E07C1F03081C127
/064B1E24B840FE0D547B0C4FE4402A0C409F0F44FF0140720840900834000069EF4059
/06690217D60B1E
/066B1E2640020F69316A0240160730B1CC40680EB8402E07B8718100EA703F78FF744B
/06891E261604703E78FF69EF40D60B40680ECC402E07C869316A02401607F0017B1665
/06A71E2604637B40FE0D547B0C4FB9402A0C409F0F44030275666E544050240720B4040
/06C51E26900834000069EF40D60B40020F69316A0A40160730B1CC40680EB8402E072C
/06E31E26B8718100EA703F78FF741604703E78FF69EF40D60B40680ECC402E07C869A1
/07011E17316A0A401607F0017B1604637B40FE0D547B0C4FB9703F7AFF40E40B342164
/071F1E26804B010139707927800A333B636DB86409FE67004E33701E7DFF0B67004E61
/073D1E261E57704E33745A044E2E745A084E2F745A10D65704D357024E55745A03D162
/075B1E26CE65660AC47566E6BB691F69126910691D691E691430764E34C840AE0CC79E
/07791E266910691954F5017069248074F837D37069258074F836CB7069268071F7456
/07971E26B384FD33076C469154DB405708409F0F402C12B96566E5B8656EF3B84895
/07B51E2648006406FE703F7AFF44000274C7B7693140C80B348AFF71800540110C0156
/07D31E268774B9BC1D4348AFF2490FF6A052D70FAC82252F91503104E2134BAFF2454
/07F11E2690FF6B05314070176406FF30774FA80503EF018774B89BC5691154FE017072
/080F1E263F7AFFA7703F96FF74C7B7B2693140C30B34A4FF71800240110CC1A474PCEF
/082D1D259863A401A574909963A501A674909A63A6A3693340CB0B34A4FF71800054
/084A1E2540210C716E9815030471B100B8706E2480706F2580A770692680703480420
/08681E2548217041343DFF4893B840C50B3429804B33324B0E3424B001373D013630B
/08861E2501383B690270792280B8347BFF4400048954893150308308100349OFFA2A
/08A40A200569003D52FD40550EB876
/08AE1E2F3468FF69FC70FDC9690A70FDC4483A70FBD701021A409B0C0A74E802C847A0
/08CC1E2F10C56906547E00150302B80503FD54F301590354F30154DD05590354F3012B
/08EA1E2F54B206590354F301402A0C016A633B1502024569010502FD55038054620902
/09081E201502046901455802C5483A0502FB55020C2A483A1A0102160463020A74C001
/09261E2056635640171301A4C74E0566450204483A74B04C4E1F403A1474E8584E17633
/09441E2058344FFF555801324CC074E057455802483A70C36356303B4FAA40F412B863
/09621E200138550202483A74C0516351405918405918B8590354F30140EB0944010001
/09801E2040000C7180013485FF4E8369004DCC44FFFF48D248450034AD09703EA0FF93
/099E1E2F40A412700E7DFF550208FF401713FC69044DCC700F7DFF34C809703EA0FFA1
/09BC1E2F40A412AA550208FF401713FC48C03485FF4893700F7DFF40D012AAB859037C
```

```
/09DA1E2F54F30144010040000C718001345FFF4E2344FF0740C50B34000069ED40D623
/09F81E2F0B40020FB8590354F30144FF0040000C7180FF3400FF40210C69ED70791240
/0A161E208040020FB8590354F30144EF0040EF0B69EF07079128040020F3400FF718045
/0A341E20EF40110CB8590354F301402A0C40D40C718111717A00717B0014620A701E1F
/0A521E209DFF484300700E7DFF6407F7401713FC700F7DFF6407FFAA690051FE6A05B2
/0A701E2040E30C00701E7DFF017B1E017A46041F4602637A693340CB0B347DFF718065
/0A8E1E2F0140210C30814FD8446B0040C50B340000703E7AFF69ED40D60B40020FB843
/0AAC1E2F590354F301402A0C409F0F44470040C50B340000369EF40D60B40020F54DE38
/0ACA1E2F03590354F301402A0C641A8040E50D6409FE7069208069067079208040303D27
/0AE81E2F13401713645A10F9640A7FB8590354F301402A0C40E50D342C0B703E9DFFSC
/0B061E204843006407F76409FE69067079208040171370692280470F6690707920029
/0B241E20806407FF6409FEB8B0690740E114483A483AC06419014017134017134017 32
/0B421E20137069228047F06409FEA0AA62590354F301402A0C40E50D34870B703E9D52
/0B601D1FFF64190148430064007F7690670792080401713706922804 70F66900701A
/0B7D1E2E7920806407FF6409FEB8B0690840E114C0006409FE690640E114C069000004A
/0B9B1E2E641901A0AA62590354F301402A0C40491244010040000C71800134A4FF40F9
/0BB90C2B210C69ED7079128040020FB883
/0BC51E2B340A804893B8A7240C80489270791380B8A7240B8048927079128005030F73A
/0BE31E2BB8A724008048927079108B840C50B34000369314 0CB0B69EE40D60BB84043
/0C011E1CC50B340003693340CB0B69EE40D60BB840020F01801B2428802A002A3D5333
/0C1F1E2BFCBB2428802D3A3080FBB8346EFF5567203472FF69803B407B0C6409FE3498
/0C3D1E2B36FF4885701F47FF74BD4E2F08670369FF182D071F74B8494E21070348A49E
/0C5B1E2B4821483670412D3711D30A07013D489540900C550302B834650274AFB8692C
/0C791E2B21D0556720CC550208C8656600B85802FDB8690454F5015701C46409FDB861
/0C971E2B641902BB64800B690640E1144CE00502EF3780150210BB40D40C717F126A35
/0CB51E2BB8540E30CC76700D0745B30CC706B2780744BFFC4407508B8307FE440750B70
/0CD31E2BB93429804B333240B07690270792280B86933401607406B0EB8B96920356A3C
/0CF11E2B114F97717F0940D40C69004DCC44FFFF48D214180D701E9DFF48430070E91
/0D0F1E2B7DFF6407F7401713FC69044DCC700F7DFF6407FFAA718100717D1140171386A
/0D2D1E2B34870048C074AFFB44FA00C848C074AFFB44900174C7B7B36A8569334016S4
/0D4B1E2B07A3644A10C748C074AFF74E267069208057304E247069278067114E1C204A
/0D691E2BB16581124E266B0540171353FB44FD0174C7B74FBB2420804A002A757D114C
/0D871E2BC60181637D4FDA307F4F68717D11340003693340CB0B34D40D016AAC1C6B6A
/0DA51E2B00703F36FFA70138 1D6A00342880083B093B0D74985E3B017D60FBC34B1160
/0DC31E2BC90A3B60C4371166111A43747B124FE0B8010109060D0703050F020C0E0A25
/0DE11E2B040B081069037079228069127079218034 29B04B10324B0E706920B0B84004
/0DFF1E3A550E2039753911B971390001384174E84969006338707926807700D6343622
/0E1D1E2BFF4883A84893703F47FF74EFBB342480083D093D013A4167026900633A406D
/0E3B1E2B900C7700B9343DFF4883A8343BFF489334660274EFB8409F0FB97177C035592
/0E591E2B6B407177007176035563B80717600B85503804E8D4CC0637C6A03585B6A0140
/0E771D2A0A4DC8717D30717E09690440E1140A644A104E5E4DC84CE0644A104E555F
/0E941E2A74E056644A104E4D555B02483A644A104E4374C0574DC0644A104E395960SC
/0EB21E2ADF644A104E3166104B3A644A104E2874C07C644A104E2026E0641901644A40
/0ED01E2A10D7307D4FAF644A10CF307E4FA7690070792080701F20B0B969FF701F2073
/0EEE1E3980645901B9747B00B96900B84017136451A0F9E758024E875503804E736C52
/0F0C1E2A03585B6C010C4DC8690540E114645A044E300C645A044E2A4DC84CE0645A62
/0F2A1E2A044E2174E056645A044E19555B02483A645A044E0F74C057645A044E074D50
/0F481E2AC0644A044FCB644A20B80C644A20BB4DC84CE0644A20B874E056644A20B879
/0F661D29555B02483A644A20B874C057644A20B84DC0645A204FD1B8401713644A43
/0F831C2704F9401713645A20F9B8645A04C55802F94F70644A20B55802F94F6755
/0F9F1E3640D80F5802FDB8402A0C5F6BC4409F0FB8401102346B00703E9DFF6407EF8F
/0FBD1E3640D80F5802C8BA644A08C754D800645A08F104FFFFAA4094014FE3405B139
/0FDB1E366409EF40CC13243BFF48B4703F4AFF64192074BF6409DFB5746AFF641920A5
/0FF91E364834701E0DFF74E0B874E5085730A4E0A502EFD7153C071504 10F14FFFF458
/10171E1395A81502027153407150001503010503DF502FE3440381CA445B307749E0F
/10351E1B1401C074AD4E4448A04394B5481A12443FF3447134844B8E48944B42A4452
/10531E13462E4B9213701E41FF1114E0102400034391A116900590269FF40C69F603F
/10711D174DDA64859064858D484100640FFD8S01SB4DC0699F40E11411344331A1440
/108E1E262F19114FDC340000715D06B54622483301SD482160AB460160BB66013T0A3D
/10AC1E26690A2704690448256350C40E01169015902483A74C058070363580150S3S813
/10CA1E26014F6356A974FF4FC640591840961340F412150201B84CC207031A4822603A
/10E81E2692635914FF105502 5100070374F85814E01032101162015910CC207CGFA
/11061E171A48226092635960E35902483A0703747C00483A6045260ES747C00483A30
/11241E17440006480004780D7483A1848A048A05902D5015B7041086700C369FFD834
```

```
/11421E1709D61848A048A05902EB015B70610867FFC38900C309483A4DC0747C004E66
/11601E1722701F43FFA574FFD8013F60E574C0411D015C635B6CFF703F45FF14FF10AE
/117E171F10116232F8449C1A74AFCA743D03C6142F1910116233E6FE
/11951E1F4CC074A063206463632065B801646357690063636364B8150280703E96FF34
/11B31E1F715D0240E01177004E1F69015902483A74C0580703635801505856014F631A
/11D11E1F5630964FE030974FDC690005027FB9015D5958483A550202483A74C0566355
/11EF1E2E564017135F02CB4CC074E0574630269F4E28407414015058580014F74E04C43
/120D1E1F5558C02483A550202483A27804FC5055803403D1474E8584FBA69003869FF61
/122B1E1FB85C02B834E816703EA0FF0503DF40A4124017135D03FA641F20400012B857
/12491E1F0502FB346412703EA0FF40A4124017135A02FA40D012AA401713B8B0B14C36
/12671E1FC11A7566F007FD4DC1690240E1144082120A4DC1484300A1A0AA6264800941
/12851E1F690640E1144CE063A46900483AC0C6480096904400E1144CE063A51502042A
/12A31E1FB84CC75710DC249DFF488214660074BDC4444700C1A507F7BA48924DC74893
/12C11E1F4300AAB8703E9DFF484300640FF7BB4CC75710DB249DFF488214660074BD9B
/12DF1E2EC4444C00C3446B001708BA48924DC7AAB8641F08B8717FFF71820A4CC0638F
/12FD1E2E5A307FC56904547E004017134CC074E05A460526F5E43082E8B85F03D7646E
/131B1E1F800001516352140000701E53FF690840E11440DF18B8403D13690340E1140D
/13391E1F404B13B86406FF5858C4648003B8648001B84CE074E056555802483A74C05B
/13571E1F574DC0B82061256117B87161006A032062C1D101626A0C6740CA6A30678029
/13751E1FC56AC060FABB3431FF717F040A708B60EA4E080A4821608A70C33B32307F79
/13931E1F4FECBB408A14403D14635801505858014F6356701F3BFF40A8141A708B605B
/13B11E1FEA402C12B8408A1440B7196351701F3BFF40BC14342CFFAD6357B8701F3DB6
/13CF1E2EFFA55C02D95D03D6407414409914014FBD420150BDB540A81416FF708B3B75
/13ED1E2EB540BC14342CFF0157BD690063636364636588013D07031B702F4FFF746B6F
/140B1E1F00CB0C1A0D4057141C0A1D53F16B133404FF0D3D0C3D1A0D1C0A4057141D56
/14291E1F53F26B0401573D53FD69FF6B043D53FDB8407414717D00015074A84F717D7A
/14471D1E034057146A0274B84F6A030A74907DB8B4B1701F4CFF6A00A548A4706615A
/14641E1EB50B746A00C76900742A8069FFA1A4B8648000690440E1144CE0634F69045A
/14821E1E40E1144CE16350B8701F3BFF409914AD634F42AD6350B840BC14482548266F
/14A01E1E601A48263404FFB840BC146B0351C83431FF0A60470BB848274827F10B0750
/14BE1E2D03746AFF14000482748368B483AC0B0696140E114A0C05154CA14B848
/14DC0A28483A483AC05154DC14B87E
/14E61E2848440034108069303D3D69EE3D3269053B6409F364190444050040EF0B7134
/15041E199C54719D6B719E00719F546407EFAA710300242B80345D156B0C3134238051
/15221E194B01242980346A15142E80717D00017D3A2D39122D3913207D5C7DF2706940
/15401E192080343301703E47FF71490434900170 3E4AFF71870B719B00408A15B80337
/155E1E2BCAD800001818280A0C880000CA3302000AFF01FF01530400020003FF0AFF2A
/157C1E2801FF01530000060002FF093301337189FF3488FF01872707C54B0032660829
/159A1E281A69FF746A00C4482152F83BB83001D340D0120502F671010564194040B933
/15B81E2816409401F969806357634C6900636763 6B636563636464714DAE714E1E6452
/15D61E2800806409BF409B0C5502104E2334FFFF40C616403A14635801503858014F3D
/15F41E28635640F4123432000502FD40AC1116FF635F640060719001719E7192FF37
/16121E1940B9164094013092F73091F43090EB34A04140C61615022064007871760408
/16301E194CC207031A4CC2070360EAF91A3076F5715180715680405918014C32
/164E1E28634F715000149001056BF840850540F41240F412401713409511556 5FFFF61B
/166C1E280502FD715D0140E011715803014F74C0504831634E40E011715802014F630D
/168A1E285640E011715801014F74C0504831634D74C04E4831634C635640F41240F426
/16A81E281240B9164094014082047 16E00710105B8645F10C5644A08B8B9000000B90E
/16C61E28703E96FF717F0140B9164094014 08B09703FB5FFA7703F96FF484574BFE69E
/16E4041D307FE6B840
/16E81E2C6409FD484300AAB0B1B45C024E6F690040E114747200C0408212013A409029
/17061E1D0C44A041406B1740171301A474C0A548311A27414E3F01A4453D0101A54413
/17241E1D00001848A048A048A04017136406FE6900C1417062480AFA6406FF6620452C
/17421E1D5802483A74C056635640D01240F412484300703FA0FF40A4121503204058 14
/17601C1B13A4A1A062013A40900CF048D269004DCC48450069044DCC640FDFB851
/177C1E2A440810018A1A018B1B018C1C018D1D018E1E018F1F747A00D1081A0C1B0D4E
/179A1E2A1C0E1D0F1E6F0069087041EB097700C50867004E8DA9482248330C48311C5A
/17B81E2A0D48311D0E48311E0F48311F480AD274128C74130C74140A7415287416193F
/17D61E2A7417080A609D609E609F77004FC20B74D8884FB C0C74D8894FB6094707CDA5
/17F41E2A48230C48311C0D48311DA94FEF48A04 8A048A03496FF48950B3D0C3D0D3BE4
/18121E1B6A080B403F18CA0C403F18C50D403F18000A1F6A200D404C18CACC404C1955
/18301E1BC50B404C18000A60E7639BBB69FFFA717D074825481AB842307DF7B9717D97
/184E0B26074821481AB852307DF7B986
```

```
/1B591E260502FE0503FE44FFFF406B1764B00069C84DDA64B5906485B0484100640F70
/1B771E26FD1114821B111450201FCBB0151635271530071540005O2FB71B20A015263FB
/1B951E265A149C1B10116240DF1B015274E05A460A26EBE63082EA15020471B20A7134
/1BB31E26550014BB1B11106240DF1B74E057460526F571B20A3082EA641F221502C11A
/1BD11E265B03E140961340F4126419104FD640BD196480001C3452FF2B60E41B6A003D
/1BEF1E3557806AFF0C3D4BB374C548955A02B60970C35780C8273FCC20576640C73784
/19OD1E26C1C43057464O3B015748A47041086700CD2780C569004DCOB869FF4DCOBB67
/192B1E26094DC0BBB340BD196480006352A369C84DDAA734381A74E7B748A474C748BD
/19491E26A048A048A434AF1D74C7B7015174E052550202483A1D6C0044FFFF406B1767
/19671E264E4BB340BD19648000A31A74E052550202483A57804F04A67061B6481AF74A
/19B51E260A6352488374E6015C5902CA7041B50B747A0069FFCB7061B50B483A747A6D
/19A31E26FF69004DC0333344AF1D74EF4FCB1469191110620150 1B014FC54CE11B4C72
/19C11E26E034FB1D74B04C4E361A0B74B04CD6602ACC44000018483EAE6640483AB879
/19DF1E356B00A5483DAEB8483A602ACA440000 1B483EAE4640B86B00A5483DAE668077
/19FD1E35493AB8483A1A0B74B04CD6602ACA440000 1B483EAE6640B86B00A5483DAE79
/1A1B1D25483AB8483A602ACC440000 1B483EAE66C0483AB86B00A5483DAE46B0B872
/1A3B1E250000000000000000000000000000000001010101010202020202030303 19
/1A561E250304040404050505060606070707080808090909A0A0B0B0B0C0C0D0D0E0EF6
/1A741E250F0F1010111112121314141515161717181919 1A1B1B1C1D1D1E1F202021EA
/1A921E252222232324252626272B292A2B2C2C2D2E2F303132333435363637383 93A3B1D
/1AB01E253C3D3E4041424344454647484 94A4B4D4E4F505 15 25 45 5 5 65 7 5B5A5B5C5D63
/1ACE1E345F60616364656668696A6C6D6F7071737475777B7A7B7D7E80B1B384B68790
/1AEC1E34398A8C8D8F9092939597989A9B9D9FA0A2A4A5A7A9AAACAEB0B1B3B5B7B8FA
/1B0A1E25BABCBEBFC1C3C5C7C9CACCCEDOD2D4D6D8DADBDDDFE1E3E5E7E9EBEDEFF176
/1B281E25F3F5F7F9FBFD00020406080A0C0E 10131517191B1E20222426292B2D2F324B
/1B461E2534381A481A4E1A531A571A5B1A5E1A611A641A671A691A6B1A6E1A701A7263
/1B641E251A741A761A781A7A1A7C1A7D1A7F1A811A821A841A851A871A8B1A8B1A8BBA
/1BB2171E1A8D1A8E1A8F1A911A921A931A951A961A971A991A9A1A39
/1B991E2D9B1A9C1A9D1A9E1AA01AA11AA21AA31AA41AA51AA61AA71AA81AA91AAB1AA1
/1BB71E2DAC1AAD1AAE1AAF1AB01AB11AB21AB31AB31AB41AB51AB61AB71AB81AB91AAC
/1BD51827BA1ABB1ABC1ABD1ABE1ABF1ABF1AC01AC11AC21AC31AC41A71
/1BED1E36C51AC51AC61AC71AC81AC91ACA1ACA1ACB1ACC1ACD1ACE1ACE1ACF1AD01AE5
/1C0B1E27D11AD11AD21AD31AD41AD51AD51AD61AD71AD81AD81AD91ADA1ADA1ADB1AC2
/1C291E27DC1ADD1ADD1ADE1ADF1AE01AE01AE11AE21AE21AE31AE41AE41AE51AE61AD0
/1C470820E61AE71AE81AE81A81
/1C4F1E2FE91AEA1AEA1AEB1AEC1AEC1AED1AEE1AEE1AEF1AF01AF01AF11AF21AF21AF9
/1C6D1E2FF31AF41AF41AF51AF51AF61AF71AF71AF81AF91AF91AFA1AFA1AFB1AFC1AF4
/1C8B1E2FFC1AFD1AFD1AFE1AFF1AFF1A001B001B011B021B021B031B031B041B041B6D
/1CA91223051B061B061B071B071B0B1B0B1B091B0A1BAE
/1CBB1E320A1B0B1B0B1B0C1B0C1B0D1B0E1B0E1B0F1B0F1B101B101B111B111B121B3C
/1CD91E32121B131B141B141B151B151B161B161B171B171B181B181B191B191B1A1B20
/1CF71E321A1B1B1B1B1C1B1D1B1D1B1E1B1E1B1F1B1F1B201B201B211B211B221B4C
/1D151A1F221B231B231B241B241B251B251B261B261B271B271B2B1B2B1BFA
/1D2F1E2E291B291B2A1B2A1B2B1B2B1B2C1B2C1B2D1B2D1B2E1B2E1B2E1B2F1B2F1BBB
/1D4D1E2E301B301B311B311B321B321B331B331B341B341B351B351B361B361B371B12
/1D6B1E2E371B371B3B1B3B1B391B391B3A1B3A1B3B1B3B1B3C1B3C1B3C1B3D1B3D1B79
/1D891C2C3E1B3E1B3F1B3F1B401B401B411B411B411B421B421B431B431B441B27
/1DA50A27441B451B451B451B461B69
/1DAF1E36010001000200050008000D00120018001F00270031003B00460052005F007A
/1DCD1E366D007C008C009C00AE00C100D500EA00FF0016012D0146015F017A01950115
/1DEB102BB201CF01ED010D022D024E027002940292
/1DFB1E370000000000000101010101020202020203030303030303030404040437
/1E191E28040405050505050506060606060606070707070707080808080808090 9C4
/1E371E2809090909090A0A0A0A0A0B0B0B0B0B0B0B0C0C0C0C0C0C0C0C0D0D0D0D4B
/1E551E280D0D0E0E0E0E0E0E0E0E0F0F0F0F0F0F0F0F101010101010111111111107
/1E731E28111112121212121212131313131313131414141414141414151515157E
/1E911E28151515151616161616161617171717171717181818181818181818 1BE7
/1EAF1E37181919191919191919 1A1A1A1A1A1A1A1A1A1A1B1B1B1B1B1B1B1B1B1B49
/1ECD1E371B1C1C1C1C1C1C1C1C1C1C1D1D1D1D1D1D1D1D1D1D1D1D1E1E1E1E1E1E1E9F
/1EEB112A1E1E1E1E1E1F1F1F1F1F1F1F1F1F1F1F1F1F1F20FE
/0015030905218515
/00000000
```

We claim:

1. An improved control system for a disk file subsystem including a head and disk assembly for storing and retrieving user data, the subsystem having direct plug in connections to address, data, and control buses of a host computer, the control system comprising:

control means for mechanically controlling the position of a head of said assembly relative to a rotating data storage disk of said assembly to cause said head to move to a commanded track of a multiplicity of available concentric data tracks formed on a storage surface of said disk during track seeking operations and to cause said head to remain in substantial centerline alignment with said commanded track during track following operations;

controller/interface means for connecting said subsystem to a host computer including means for receiving commands and data to be stored from said host computer directly via the direct plug in connections to at least one of its said address, data and control buses, including means for controlling the storing and retrieving of data from said surface via said head, including means for reporting subsystem status and conditions to said host computer and including means for controlling the sending of retrieved data to said host computer via said interface and at least one of the said address, data and control buses of the host computer; and a single programmed control microprocessor for operatively controlling user data disk storage and retrieval operations of said subsystem via said control means and host to disk data transfer operations of said controller/interface means in response to said commands received from said host computer via said controller/interface.

2. The improved control system set forth in claim 1 wherein said control means comprises at least one servo loop for sampling, holding and processing track centerline information sampled from the data storage surface which is closed through said microprocessor in order to cause said head to remain in substantial centerline alignment with said commanded track during track following operations.

3. The improved control system set forth in claim 1 wherein said control means comprises a plurality of servo loops, a main servo loop including polyphase position sensor means mechanically linked to said head for coarse servo control and for track boundary determination, and a fine servo loop including centerline offset information read by said head from said data surface at least once per revolution of said disk and wherein said microprocessor receives data from said main servo loop and data from said fine servo loop in order to maintain said head in substantial centerline alignment with said command track during track following operations of said head and disk assembly.

4. The improved control system set forth in claim 1 wherein said head and disk assembly includes an aerodynamically released shipping latch for latching said head in a safe region relative to said disk and further comprising an electronic return spring including sensing means for sensing loss or removal of power from said system and switching means for thereupon connecting voltage induced in a winding of a spindle motor rotating by virtue of kinetic energy stored in said disk ordinarily rotated by said motor, to an electromechanical head mover, so as to move said head to said safe region before said disk ceases to rotate sufficiently to maintain headflight.

5. The improved control system set forth in claim 2 further comprising bump detector means including said programmed digital microprocessor means and said servo loop for detecting the occurrence of mechanical shocks during writing operations on a data track and thereupon automatically inhibiting any writing to the disk surface in the event of detection of a mechanical shock which tends to move the head off of track centerline alignment.

6. The improved control system set forth in claim 1 wherein said controller/interface means includes a data sequencer for controlling the storing and retrieving of data from said surface via said head and an interface directly connected to the address, data and control buses of the host computer, said data sequencer including a plurality of internal control registers directly readable by said single programmed microprocessor, so that commands from said host computer may be recorded in said internal control registers of said sequencer from at least one of said address, data and control buses of said host computer via the interface, and so that the microprocessor may thereafter obtain the host commands to be executed by reading said internal control registers of said sequencer.

7. The control system set forth in claim 6 wherein said controller/interface means further comprises a buffer memory connected between said data sequencer and said interface for storing blocks of user data for transfer between said disk storage surface and said host computer, and a memory controller controlled by said microprocessor and connected to generate and put out addresses to said buffer memory for writing and reading said blocks of user data into and out of said buffer memory.

8. The improved control system set forth in claim 1 wherein said control system is comprised of electronics components mounted on a single substrate, said circuit substrate including subsystem to host connection means for mating with corresponding connection means of the host computer thereby providing the direct plug in connection to the address, data and control buses of the host computer; and, control system to head and disk assembly connection means for enabling connections to said head and disk assembly.

9. The control system set forth in claim 8 wherein said direct plug in connection between the subsystem and host computing system comprises an edge connector portion of said substrate, the edge connector adapted to mate with a receptable of the host computer leading to the address, data and control buses thereof.

10. The control system set forth in claim 8 wherein said control system to said head and disk assembly connection means comprises at least one plug and a mating jack.

11. The control system set forth in claim 1 wherein the data controller/interface means further includes data separator means connected to convert data words received from said host computer system into a serial bit stream for recording onto the disk surface during data write operations, and to convert serial bits in a stream bits received as a stream from the data surface into data words, in accordance with a predetermined data format arrangement.

12. The control system set forth in claim 11 wherein the data separator means encodes the predetermined data format arrangement as 2,7 variable length, zero round length limited code format during data write operations and decodes the predetermined data format arrangement during data read operations.

13. An improved control system for a disk file subsystem including a head and disk assembly for storing and retrieving user data, the subsystem being directly connected to address, data, and control buses of a host computer, the control sytem comprising:

control means for electromechanically controlling the position of a head of said assembly relative to a rotating data storage disk of said assembly to cause said head to move to a commanded track of a multiplicity of available concentric data tracks formed on a storage surface of said disk during track seeking operations and to cause said head to remain in substantial centerline alignment with said commanded track during track following operations;

controller/interface means for connecting said subsystem to a host including means for receiving commands and data to be stored from said host computer directly via at least one of its said address, data and control buses, including means for controlling the storing and retrieving of data from said surface via said head, including means for reporting subsystem status and conditions to said host computer and including means for controlling the sending of retrieved data to said host via said interface means and at least one of the said address, data and control buses of the host computer and a single programmed control microcprocessor for operatively controlling user data disk storage and retrieval operations of said subsystem via said control means and host to disk data transfer operations of said controller/interface means in response to said commands received from said host computer via said controller/interface, said control means further including at least one servo loop which samples, holes and processes track centerline information from the storage surface and which is closed through said microprocessor to control head position correction to track centerline during track following operations, and said microprocessor including program memory means for causing said microprocessor to remain in a main program loop in which said one servo loop is closed so that said head is maintained in substantial alignment with centerline of a said concentric data track and so that said microprocessor may exit said main program loop in order to execute a selected one of a plurality of available service routines which may be commanded by said host computer in order to carry out data read and write operations among the multiplicity of concentric data tracks.

14. The improved control system set forth in claim 13 wherein said control means comprises a plurality of servo loops, a main servo loop including polyphase position sensor means mechanically linked to said head for coarse servo control and for track boundary determination, and a fine servo loop including centerline offset information read by said head from said data surface at least once per revolution of said disk and wherein said microprocessor receives data from said main servo loop and data from said fine servo loop in order to maintain said head in substantial centerline alignment with said commanded track during track following operations of said head and disk assembly.

15. The improved control system set forth in claim 13 whrein said head and disk assembly includes an aerodynamically released shipping latch for latching said head in a safe region relative to said disk and further comprising an electronic return spring including sensing means for sensing loss or removal of power from said system and switching means for thereupon connecting voltage induced in a winding of a spindle motor rotating by virtue of kinetic energy stored in said disk ordinarily rotated by said motor, to an electromechanical head mover, so as to move said head to said safe region before said disk ceases to rotate sufficiently to maintain headflight.

16. The improved control system set forth in claim 13 further comprising bump detector means including said programmed digital microprocessor means and said servo loop for detecting the occurrence of mechanical shocks during writing operations on a data track and thereupon automatically inhibiting any writing to the disk surface in the event of detection of a mechanical shock which tends to move the head off of track centerline alignment.

17. The improved control system set forth in claim 13 wherein said control system is comprised of electronics components mounted on a single substrate, said circuit substrate including subsystem to host connection means for mating with corresponding connection means of the host computer thereby enabling direct plug in connection to the address, data and control buses of the host computer; and, control system to head and disk assembly connection emans for enabling connections to said head and disk assembly.

18. The control system set forth in claim 17 wherein said subsystem to host connection means comprises an edge connector portion of said substrate, the edge connector adapted to mate with a receptacle of the host computer leading to the address, data and control buses thereof.

19. The control system set forth in claim 17 wherein said control system to said head and disk assembly connection means comprises at least one plug and a mating jack.

20. The improved control system set forth in claim 13 wherein said controller/interface means includes a data sequencer for controlling the storing and retrieving of data from said surface via said head and an interface directly connected to the address, data and control buses of the host computer, said data sequencer including a plurality of internal control registers directly readable by said single programmed microprocessor, so that commands from said host computer may be recorded in said internal control registers of said sequencer from at least one of said address, data and control buses of said host computer via the interface, and so that the microprocessor may thereafter obtain the host commands to be executed by reading said internal control registers of said sequencer.

21. The control system set forth in claim 20 wherein said controller/interface means further comprises a buffer memory connected between said data sequencer and said interface for storing blocks of user data for transfer between said disk storage surface and said host computer, and a memory controller controlled by said microprocessor and connected to generate and put out addresses to said buffer memory for writing and reading said blocks of user data into and out of said buffer memory.

22. A method for controlling operation of a Winchester fixed disk data storage subsystem including a head and disk assembly for storing and retrieving user data, a data controller/interface connecting directly to address, data, and control buses of a host computer system, a head position control electromechanical mechanism associated with the head and disk assembly and including at least one servo control loop for sampling and holding track centerline information from a data storage surface of a storage disk and for using the sampled and held centerline information for controlling track centerline position of a head of said assembly relative to a selected one of a multiplicity of concentric data tracks defined on the storage surface of the rotating data storage disk of said assembly, and a single programmed control microprocessor connected to control the data controller/interface and the head position controller, the method including the steps of:

receiving, decoding and executing host commands at the microprocessor via the controller/interface and the head position controller by:

causing the head to move to each selected data storage track of a multiplicity of available concentric data storage tracks formed on a surface of the disk during track seeking operations;

controlling the head position control electromechanical mechanism by correcting head position driver information to be in substantial centerline alignment with each commanded track during track following operations by reference to the sampled and held centerline information;

carrying out one of storing and retrieving of the user data from the commanded track via the head, and sending and receiving of the user data to and from the host computing system via the controller/interface, during the track following operations; and, reporting subsystem status and conditions including command execution completion to the host computing system via the controller/interface.

23. The method set forth in claim 22 wherein the data controller/interface includes data sequencer having a plurality of storage registers directly associated therewith and directly readable by the single microprocessor and wherein the step of obtaining commands from the host computing system includes the steps of:

receiving each command from the host at a subsystem interface, transferring the command from the subsystem interface to one of the storage registers of the data controller/interface; and, reading the contents of the one register directly by the microprocessor to obtain the host command stored therein for execution.

24. The method set forth in claim 22 wherein the single programmed control microprocessor includes a look up program table including control routines for decoding and executing each host computing system command received via said data controller/interface and wherein the steps of decoding and executing the command include the step of executing one of the control routines from the look up program table pointed to by the command.

25. The method set forth in claim 22 wherein said controller/interface means further comprises a buffer memory and a buffer memory controller, and further includes the steps of:

supervising with the microprocessor the buffer memory controller to generate and put out user data storage addresses to the buffer memory, storing and retrieving blocks of user data in accordance with the user data storage addresses so that the blocks may be transferred between the tracks and the host computing system directly, via the data controller/interface and the data bus of the host computing system.

26. The method set forth in claim 25 wherein the data controller/interface data sequencer having a plurality of storage registers associated therewith and directly readable by the single microprocessor and wherein the steps of maintaining commands from the host computing system includes the steps of:

receiving each command from the host at a subsystem interface and recording each command in the buffer memory, transferring the command from the buffer memory to one of the storage registers of the data data sequencer, and reading the contents of the one register directly by the microprocessor to obtain the host command for execution.

27. The method as set forth in claim 22 wherein the head position control electromechanical mechanism includes an electromagnetic voice coil actuator and a position sensor for positioning and stabilizing the head relative to track boundaries, the method further including the steps of:

repeatedly sampling at a predetermined sampling rate track position information from the position sensor which is indicative of present head location during a track seeking operation and sending each sample to the microprocessor, looking up in a head position look up table with the microprocessor prestored position information on the desired position at which the transducer head should be located for each sample during the track seeking operation, calculating desired head transducer position by comparing actual transducer head position at each signalled time elapse with the prestored position information, calculating a position correction value in the event of a discrepancy, and generating and applying a current related to the position correction value to the voice coil actuator to urge actual head transducer position into correspondence with desired head transducer position during an elapsed time interval between the present and next succeding sample.

28. The method set forth in claim 27 wherein the position sensor comprises polyphase optical encoder means, and the head position control electromechanical mechanism further includes comparator means, and the position sampling step includes the step of generating polyphase position signals with the polyphase optical encoder means and comparing the analog polyphase position signals put out by the optical encoder means in the comparator means to provide digital track position information to the microprocessor during track seeking operations.

29. The method set forth in claim 27 comprising in the track following mode of operation the further step of monitoring with the microprocessor the position sensor during user data writing operations to detect any occurrence of mechanical shocks; and, upon detection of a shock, automatically inhibiting any writing to the disk surface in the event of a detected mechanical shock tending to move the head off of track centerline alignment.

30. The method set forth in claim 22 wherein the steps of receiving, decoding and executing host commands at the microprocessor via the controller/interface and reporting subsystem status and conditions including command execution completion to the host computing system via the controller/interface are carried out via host input/output command and data port and status port addresses of the subsystem and wherein the host computing system accesses the subsystem status port in order to synchronize transfer of data between the host computing system and the subsystem command and data port.

31. The method set forth in claim 22 wherein the data controller/interface means further includes data separator means and the method comprises the further steps of:
converting with the data separator means data words received from said host computing system into a serial bit stream for recording onto the disk surface during data write operations, and
converting serial bits in a stream bits received as a stream from the data surface into data words, in accordance with a predetermined data format arrangement.

32. The method set forth in claim 31 wherein the data separator means carries out the further steps of encoding the predetermined data format arrangement as 2,7 variable length, zero run length limited code format during data write operations and decoding the 2,7 variable length, zero run length limited code format into the predetermined data format during data read operations.

33. An improved control system for a disk file subsystem including a head and disk assembly for storing and retrieving user data, the subsystem being operatively connected to logical address, data, and control bus lines of a host computer, the control system comprising:
control means for electromechanically controlling the position of a head of said assembly relative to a rotating data storage disk of said assembly to cause said head to move to a commanded track of a multiplicity of available concentric data tracks formed on a storage surface of said disk during track seeking operations and to cause said head to remain in substantial centerline alignment with said commanded track during track following operations;
controller/interface means including means for receiving commands and data to be stored from said host computer directly via the lines of at least one of its said address, data and control buses, including means for controlling the storing and retrieving of data from said surface via said head, including means for reporting subsystem status and conditions to said host computer and including means for controlling the sending of retrieved data to said host via said interface means and at least one of the said address, data and control buses of the host computer; and
a single programmed control microprocessor for operatively controlling user data disk storage and retrieval operations of said subsystem via said control means and host to disk data transfer operations of said controller/interface means in response to said commands received from said host computer via said controller/interface,
said control means further including at least one servo means for sampling, holding and processing track centerline information from the storage surface to control head position correction to track centerline during track following operations, and
said microprocessor including program memory means including a servo service routine for causing said microprocessor to participate with said control means to operate said servo means during track following operations in order to maintain said head in substantial alignment with centerline of a said concentric data track, the program memory means including a host command decode routine and a plurality of service routines executable by said microprocessor so that the microprocessor decodes a command received from host computer via said controller/interface and thereupon executes at least one of said service routines in response to the decoded command in order to carry out data read and write operations among the multiplicity of concentric data tracks.

34. The improved control system set forth in claim 33 wherein said control system is comprised of electronics components mounted on a single mounting and connection substrate, said substrate including subsystem to host connection means for mating with corresponding connection means of the host computer thereby enabling direct plug in connection to the address, data and control buses of the host computer; and, control system to head and disk assembly connection means for enabling connections to said head and disk assembly.

35. The control system set forth in claim 34 wherein said subsystem to host connection means comprises an edge connector portion of said substrate, the edge connector being adapted to mate with a receptacle of the host computer leading to the address, data and control buses thereof.

36. The control system set forth in claim 34 wherein said control system to said head and disk assembly connection means comprises at least one plug and a mating jack.

37. The control system set forth in claim 33 wherein said controller/interface means further comprises a buffer memory connected between said data sequencer and said interface for storing blocks of user data for transfer between said disk storage surface and said host computer, and a memory controller controlled by said microprocessor and connected to generate and put out addresses to said buffer memory for writing and reading said blocks of user data into and out of said buffer memory.

38. The control system set forth in claim 33 wherein said track centerline servo information is sampled only once per revolution of the disk and wherein servo means further includes a polyphase position sensor mechanically linked to said head to provide coarse track position control values during track following operations which are combined with said track centerline information sampled from the storage surface in order to control head position during track following operations.

* * * * *

UNITED STATES PATENT AND TRADEMARK OFFICE
CERTIFICATE OF CORRECTION

PATENT NO. : 4,819,153

DATED : April 4, 1989

INVENTOR(S) : Randolph H. Graham

It is certified that error appears in the above-identified patent and that said Letters Patent is hereby corrected as shown below:

On the Title Page, Item [22], "Jun. 5, 1985" should read

-- Jun. 4, 1985 --.

Signed and Sealed this

Twenty-first Day of November, 1989

Attest:

JEFFREY M. SAMUELS

Attesting Officer     Acting Commissioner of Patents and Trademarks